United States Patent [19]

Goldsworthy

[11] Patent Number: 4,469,541

[45] Date of Patent: Sep. 4, 1984

[54] METHOD FOR FORMING REINFORCED PLASTIC COMPOSITE ARTICLES

[75] Inventor: William B. Goldsworthy, Palos Verdes Estates, Calif.

[73] Assignee: Goldsworthy Engineering, Inc., Torrance, Calif.

[21] Appl. No.: 567,647

[22] Filed: Jan. 3, 1984

Related U.S. Application Data

[62] Division of Ser. No. 329,757, Dec. 11, 1981, Pat. No. 4,440,593.

[51] Int. Cl.³ .......................... B32B 1/10; B32B 31/26
[52] U.S. Cl. .................................... 156/180; 156/245; 264/258
[58] Field of Search .............. 156/180, 441, 433, 166, 156/324, 181, 245, 500; 264/137, 263, 257, 258

[56] References Cited

U.S. PATENT DOCUMENTS

| | | | |
|---|---|---|---|
| 2,694,661 | 11/1954 | Meyer | 156/180 |
| 3,470,286 | 9/1969 | Weber | 425/373 |
| 3,860,011 | 1/1975 | Norman | 131/198 |
| 3,873,399 | 3/1975 | Goldsworthy et al. | 156/180 |
| 4,276,337 | 6/1981 | Coonrod | 156/180 |

Primary Examiner—Michael Ball
Attorney, Agent, or Firm—Robert J. Schaap

[57] ABSTRACT

Reinforced plastic composite articles which have a non-constant cross-sectional shape over their length, such that a first portion of the article has a different cross-sectional shape than a second portion of the article, and which portions may be integral with each other. In one embodiment, the article may have a non-constant cross-sectional shape with a constant cross-sectional volume over its length. In another embodiment, the article may have a non-constant cross-sectional shape and non-constant cross-sectional volume over its length. An apparatus and a method which utilizes a die having a die channel of non-constant cross-sectional shape is employed. In the apparatus, a pair of first and second die-forming members are used, and form in one or both of the die-forming members a die channel having a first portion of a cross-sectional shape which is different than a cross-sectional of a second die channel portion over the length of the die channel. One of the die-forming members may move relative to the other or both may move together at a constant speed in order to effectively pultrude a reinforced plastic composite article.

24 Claims, 30 Drawing Figures

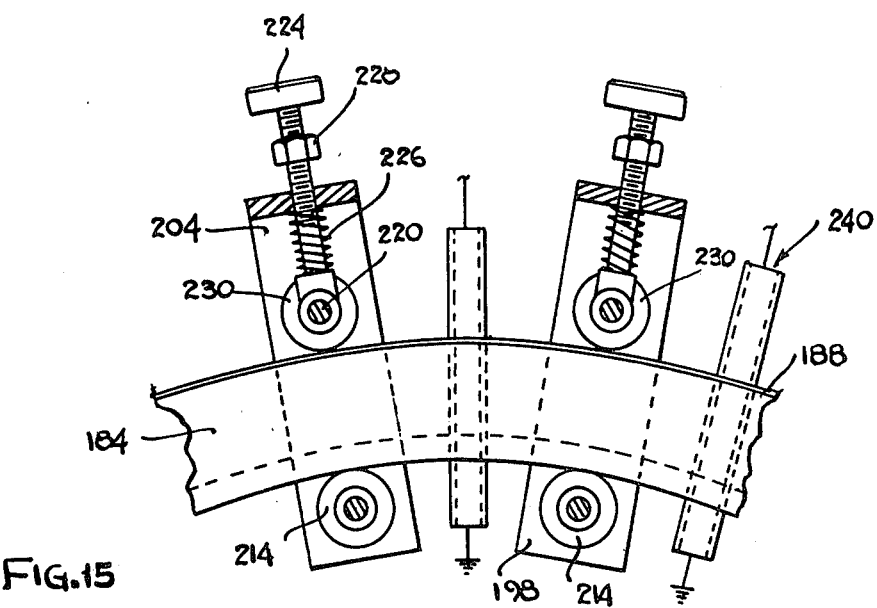
FIG.15
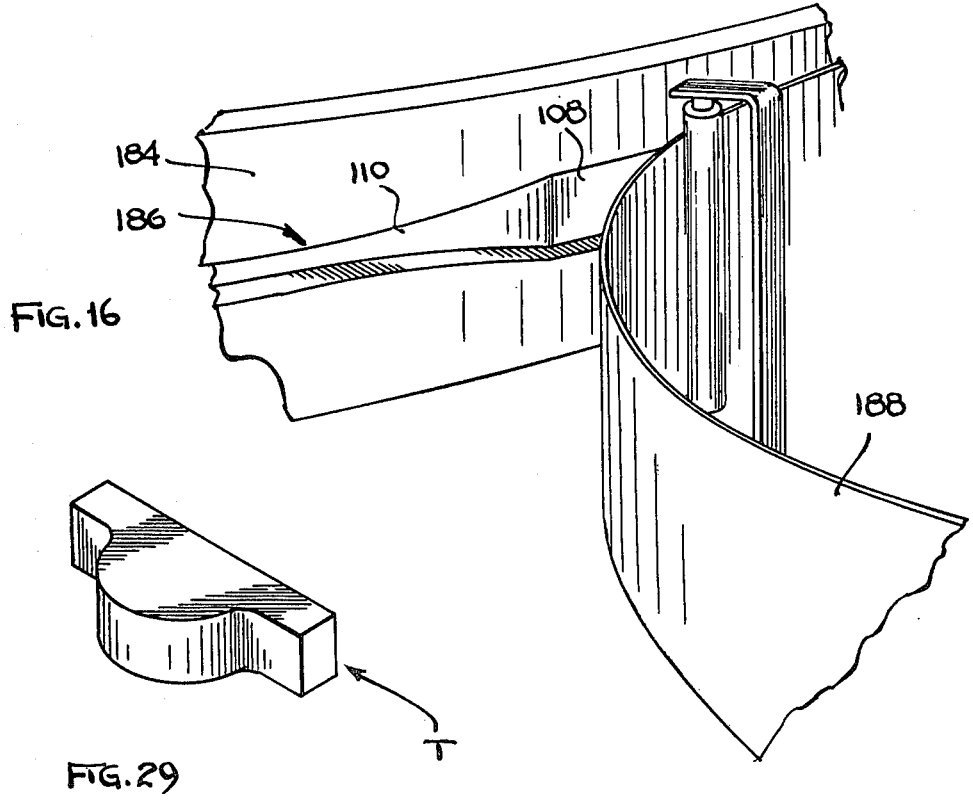
FIG.16
FIG.29

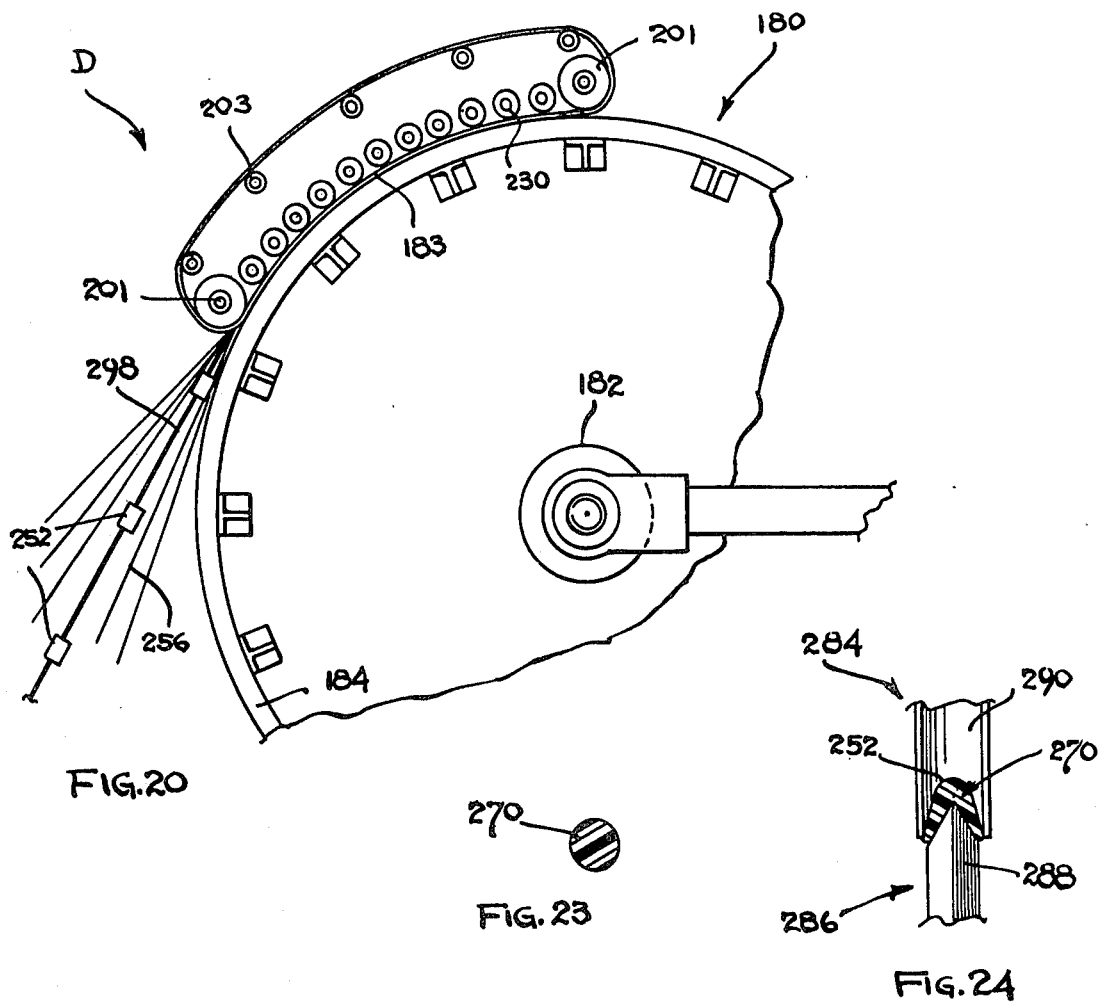
FIG.20
FIG.23
FIG.24
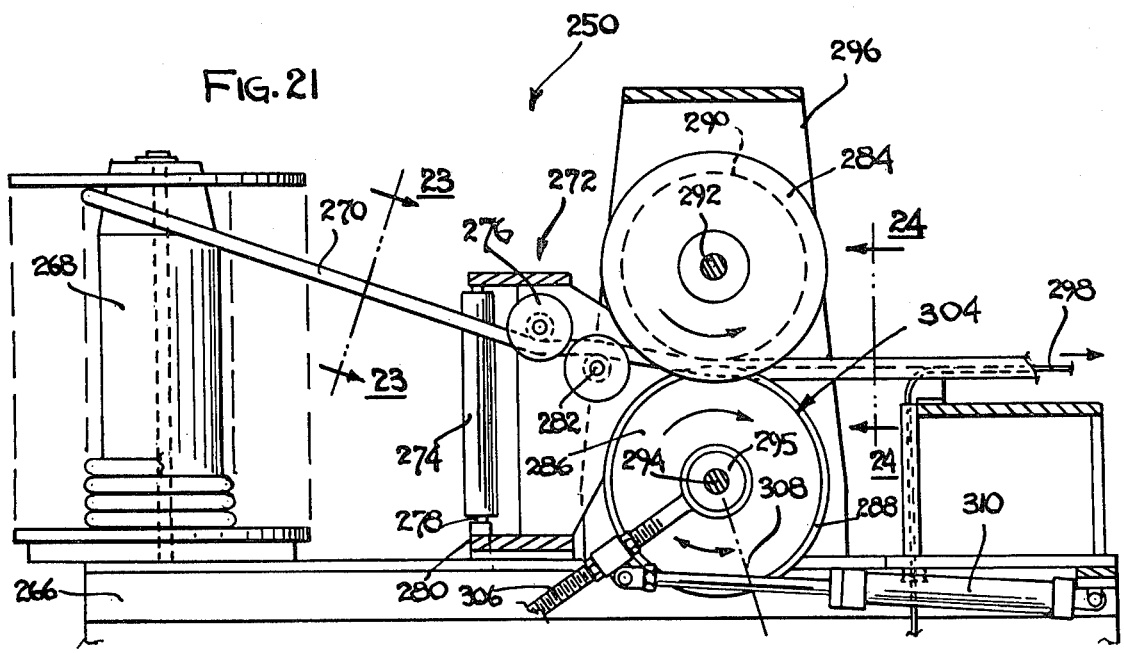
FIG.21

METHOD FOR FORMING REINFORCED PLASTIC COMPOSITE ARTICLES

RELATED APPLICATION

This is a divisional of application Ser. No. 329,757, now U.S. Pat. No. 4,440,593, filed Dec. 11, 1981.

BACKGROUND OF THE INVENTION

1. Field of the Invention

This invention relates in general to certain new and useful improvements in reinforced plastic composite articles which may have non-constant cross-sectional shapes over their length and an apparatus and method for producing the same and more particularly, to reinforced plastic composite articles and an apparatus and method for producing the same, such that the reinforced plastic composite articles have a first portion of a cross-sectional shape which is different than the cross-sectional shape of an integral second portion of the same article over the length thereof, or otherwise articles which have a different cross-sectional volume over their length.

2. Brief Description of the Prior Art

For several years, various forms of reinforced plastic articles, generally structural articles, have been produced by the technique of pultrusion and include a wide variety of bars, tubes and other profile forms. These articles have found widespread use in widely diversified fields of application, including, for example, electrical, industrial, and structural applications, and even in consumer end products. In fact, due to the relatively low cost of reinforced plastic composite articles, the corrosion resistance attributes, and the very substantial strength-weight ratio afforded by these articles, in many cases they have replaced counterpart articles typically constructed from metals and other materials.

The pultrusion method and apparatus generally involves the straight pulling of various types of continuous composite reinforcements, such as continuous glass, graphite, or boron, through a resin impregnation system and through a shaping and forming die where the composite composition is cured into its final structural form. In this system, the shaping and forming die, which is linear over its length, generally imparts to the composite, the size and shape of the die and the composite is then cured in this final size and shape as it exits the shaping and forming die. This type of pultrusion system is more fully illustrated and described in U.S. Pat. No. 2,871,911, dated Feb. 3, 1959 and in U.S. Pat. No. 3,556,888, dated Jan. 19, 1971 by William Brandt Goldsworthy.

The conventional pultrusion system is somewhat analogous to extrusion, in that the pultrusion system operates continuously to produce constant-section shapes and profiles, which may be formed of a resin matrix impregnated reinforcing fiberous material such as, for example, fibrous-glass and polyester resin. In this type of pultrusion system, the composite article is essentially pulled through the shaping/forming die in a substantially linear path, by means of one or more puller mechanisms, which are located downstream from the shaping/forming die. In this way, the composite article is formed on a continuous basis as a linear profile form.

For many years, only relatively straight pultruded articles could be formed. U.S. Pat. No. 3,873,399, dated Mar. 25, 1975 by William Brandt Goldsworthy, et al., provided a method and an apparatus whereby reinforced plastic composite articles could be curved over at least a portion of their length. In accordance with this apparatus and method, a moving die which generally rotated in an arcuate path and having a die channel cooperated with a stationary die such that the combination of the mating two dies could form a die channel. As the moveable die was rotated, reinforced plastic composite materials were pulled through the die channel and simultaneously cured while in the die channel in order to form an article which was curved over a portion of its length.

In the aforesaid U.S. Pat. No. 3,873,399, there is also taught a method of producing articles which were curved, but did not have a constant radius. In other words, one portion of an article, which was arcuate in shape, was defined by a radius which was different from another portion of the same integrally formed article. However, in order to produce such an article, a very cumbersome and time consuming manual intervention was required. For example, in order to form two arcuately shaped legs connected by a corner portion, it was necessary to form the first arcuately shaped leg, remove the die, thereafter manually bend the corner portion, and subsequently with another die, form the second arcuately shaped leg. Thus, the apparatus, while capable of producing such an article, was very cumbersome and not very effective in this particular aspect.

Also, in the aforesaid U.S. Pat. No. 3,873,399, there is taught an apparatus and method for producing an article which was referred to as being of non-constant cross-sectional shape. In the context of the aforesaid U.S. Pat. No. 3,873,399, an article having non-constant cross-sectional shape was one that had a different shape at an upper portion, for example, compared to a lower portion. In other words, a T-shaped article could be produced so that the upper section had a generally horizontally disposed segment and the lower section had a generally vertically disposed segment. Nevertheless, the articles which were produced in accordance with the apparatus and method taught in the aforesaid U.S. Pat. No. 3,873,399 always had a constant cross-sectional shape over their length. In other words, one portion of the article could not have been produced with a cross-sectional shape different than another integral portion of the same article.

OBJECTS OF THE INVENTION

It is, therefore, a primary object of the present invention to provide a reinforced plastic composite article which has a first portion of a cross-sectional shape which is different from the cross-sectional shape of a second integrally formed portion of the same article, such that the article has a non-constant cross-sectional shape over its length.

It is another object of the present invention to provide a reinforced plastic composite article of the type stated, in which the article has a non-constant cross-sectional shape over its length with a constant cross-sectional volume over its length.

It is a further object of the present invention to provide a reinforced plastic composite article of the type stated in which the article has a non-constant cross-sectional shape and a non-constant cross-sectional volume over its length.

It is also an object of the present invention to provide a reinforced plastic composite article of the type stated which has sections defined by different radii and which are continuously produced.

It is still a further object of the present invention to provide an apparatus for producing reinforced plastic composite articles having non-constant cross-sectional shape and which include a pair of die-forming members which together create a die channel, having a non-constant cross-sectional shape, such that filament containing reinforced plastic material, when pulled through the die channel, will result in an article having non-constant cross-sectional shape.

It is a salient object of the present invention to provide an apparatus of the type stated in which filler inserts are introduced into a stream of the filament containing reinforced plastic material in order to provide an article having non-constant volume over its length, and non-constant cross-sectional shape over its length.

It is yet a further object of the present invention to provide an apparatus of the type stated which is highly efficient in its operation and can be operated on a highly automated basis requiring minimum manual attention.

It is still another salient object of the present invention to provide a method for producing a reinforced plastic composite article having a non-constant cross-sectional shape which involves the passing of filament containing reinforced plastic material into a die cavity of non-constant cross-sectional shape over its length, and curing the filament containing reinforced plastic composite material while in said cavity.

With the above and other objects in view, my invention resides in the novel features of form, construction, arrangement, and combination of parts presently described and pointed out in the claims.

BRIEF SUMMARY OF THE DISCLOSURE

A reinforced plastic composite article may be produced in accordance with the invention and which has a non-constant cross-sectional shape. As used herein, the term "non-constant" and the term "cross-sectional shape" as used in connection with an article so produced means that the article may have a first portion which is of a cross-sectional shape different than a cross-sectional shape of a second portion of the same article which is integral with the first portion over the length of this article. In like manner, when these terms are used in connection with the die cavity or the apparatus in general used to produce such articles, these terms refer to a mechanism having a die cavity having a first cross-sectional shape which is different than a second portion of the cavity integral with the first cross-sectional shape and having a cross-sectional shape different than the first portion.

The reinforced plastic composite articles, which may be produced in accordance with the present invention, while having a non-constant cross-sectional shape, may have either a constant cross-sectional volume, or otherwise, a non-constant cross-sectional volume. In other words, the article may have a first portion of a first cross-sectional shape and a second portion of a cross-sectional shape, different than that of the first cross-sectional shape, but which first and second portions each contain a constant volume of material. In another embodiment, the article may have a first portion of a first cross-sectional shape and a second integrally formed portion of a different second cross-sectional shape and where the second portion has a greater volume of reinforced plastic composite material forming said second portion.

In generally all cases, the articles which are produced are curved over their length. The articles are produced in a continuously formed stream, and may be separated from one another as they exit the die cavity in a manner to be hereinafter described in more detail. Furthermore, in accordance with the present invention, in one embodiment, it is possible to produce an article which is of constant radius over its length, and in another embodiment it is possible to produce an article which is of non-constant radius over its length. In other words, the article may have a first portion of non-constant cross-sectional shape and which is defined by a first radius, and a second portion of non-constant cross-sectional shape, but which is arcuate and defined by a different radius.

The terms "filament containing reinforced plastic composite article" and "filament containing reinforcing material" and similar terms merely imply that the reinforcing material, whether separate or incorporated in the composite article, is comprised only of fibers or filaments, or that a very substantial portion of the material is comprised of fibers or filaments (when not impregnated or coated with a resin matrix). Thus, for example, a smaller portion of the reinforcing material could be comprised of non-filament or non-fiber materials such as wires or the like as hereinafter described.

In the various described and illustrated embodiments of the apparatus and method which is designed to produce such reinforced plastic composite articles, filament containing reinforcing material, which may be impregnated with a binder, such as a resin matrix, is passed into a die cavity. This die cavity is formed by a first die-forming member which cooperates with and has a mating surface which engages a mating surface of a second die-forming member.

A die-forming recess is provided in one of the die-forming members and cooperates with the other of the die-forming members to provide a die channel adapted to receive the filament containing reinforcing material. The die-forming member, which is provided with the recess is preferably the first die-forming member which is moved relative to the second of the die-forming members to form the die channel. Hence, the die channel, formed primarily of the first die-forming member, may be moved relative to the other of the die-forming members.

The filament containing reinforced plastic material is moved with the moveable die-forming member and is also simultaneously cured while located in the die channel. When the resin impregnated reinforced plastic composite material is so cured, it will provide the desired reinforced plastic composite article having the shape effectively imparted by the die channel. Continued movement of the first die-forming member relative to the second will cause the hardened and finally cured reinforced plastic composite article to exit from the die channel.

In still another embodiment of the apparatus, both of the die-forming members may be moveable. In the first embodiment, the die-forming members involve a first moveable die and a second fixed die. In the second of the embodiments of the apparatus, the first die-forming member is a moveable die segment having the die-forming recess therein. The second die-forming member, in still a further embodiment, may adopt the form of a continuous belt which has a flat surface located to engage the flat surface of the first die-forming member containing the recess. In this way, the continuously moving belt, constituting the second die-forming member, which is somewhat yieldable, and the first die-forming member, together, form a die channel adapted to receive the filament containing reinforced plastic composite material. The belt may engage the face of the first die-forming member, or rotating ring die, for only a portion of its arcuate length. The belt is continuous and trained around a group of rollers located to move the belt into continuous engagement with at least a portion of the rotating die segment so as form a continuous die channel.

In each embodiment of the apparatus, it is preferable to provide a precuring mechanism which initiates a cure of the binder, such as a curable resin matrix, which is impregnated into the filament containing reinforcing material. In other words, a cure of the resin matrix is initiated, but which does not proceed to a C-stage or final cure until additional curing radiation is applied, as for example, while the reinforced plastic composite material is within the die channel.

The moveable die may be referred to as a forming and shaping die inasmuch as it contains the die-forming recess, which when closed by the second die-forming member, forms a die cavity. Further, it is this die cavity which shapes and forms the reinforced plastic composite material and imparts to this material the shape and size of the die cavity. The forming and shaping die is curved over its length in the direction of movement of the reinforced plastic composite material.

In one of the preferred embodiments of the apparatus, the continuous belt, which functions as the second die-forming member, is trained around a plurality of rollers. Camming rollers engage the rear or interiorly presented surface of the moveable die, often referred to as the "female" die. In like manner, belt supporting rollers are located to hold the continuous belt into engagement with the opposed surface of the moving die which contains the elongate recess therein. Each of the pairs of rollers are mounted on brackets, which together, form a housing for holding the continuous belt in continuous mating with the exterior face of the moveable first die segment. Furthermore, each of these brackets are designed to carry a cartridge heater which functions as the curing means associated with the die channel.

In still another embodiment of the invention, the apparatus and method are designed to specifically create reinforced plastic composite articles which have a non-constant cross-sectional shape over their length and also have a non-constant cross-sectional volume over their lengths. In this embodiment of the apparatus, a plug-generating device is employed and operates to create a plurality of individual spaced apart plugs which serve as a type of filler material and introduced into the die cavity along with the binder impregnated reinforcing material. These individual plugs may be formed of a suitable material which is capable of being shaped or effectively "molded" to a desired shape and fed into the die cavity along with the reinforcing material at the desired intervals such that each plug would be located to be inserted into a portion of the die cavity where greater volume of the article is to result.

More specifically, and in this latter embodiment of the invention, the plug-generating device is designed to provide a continuous string of the plug-forming material and which is shaped so that it can be disposed over and carried by a continuous cord. While on the continuous cord, the continuous string of plug-forming material is cut (but not the cord) into individual discrete elongate sections with each section ultimately being formed into a desired plug. Thereafter, a cold die mechanism, often referred to as a "cold die" briquetting "mechanism" is employed to shape the individual sections of the plug-forming material into a desired shape. Thereafter, each plug while on the continuous cord is introduced into the continuous supply of reinforcing material, such as the strands of reinforcing material as they enter into the die cavity.

When the binder impregnated reinforcing material is hardened, it will effectively include therein the plug and which essentially is encapsulated within a portion of the reinforcing material. In this way, the resultant plastic article has a volume in one portion which is different than a volume in the next adjacent portion and also a shape in one portion which is different than the next adjacent intergrally formed portion.

This invention possesses many other advantages and has other purposes which may be made more clearly apparent from a consideration of the forms in which it may be embodied. These forms are shown in the drawings forming and accompanying part of the present specification. They will now be decribed in detail for the purposes of illustrating the general principals of the invention, but it is to be understood that such detailed decriptions are not to be taken in a limiting sense.

BRIEF DESCRIPTION OF THE DRAWINGS

Figure 1:
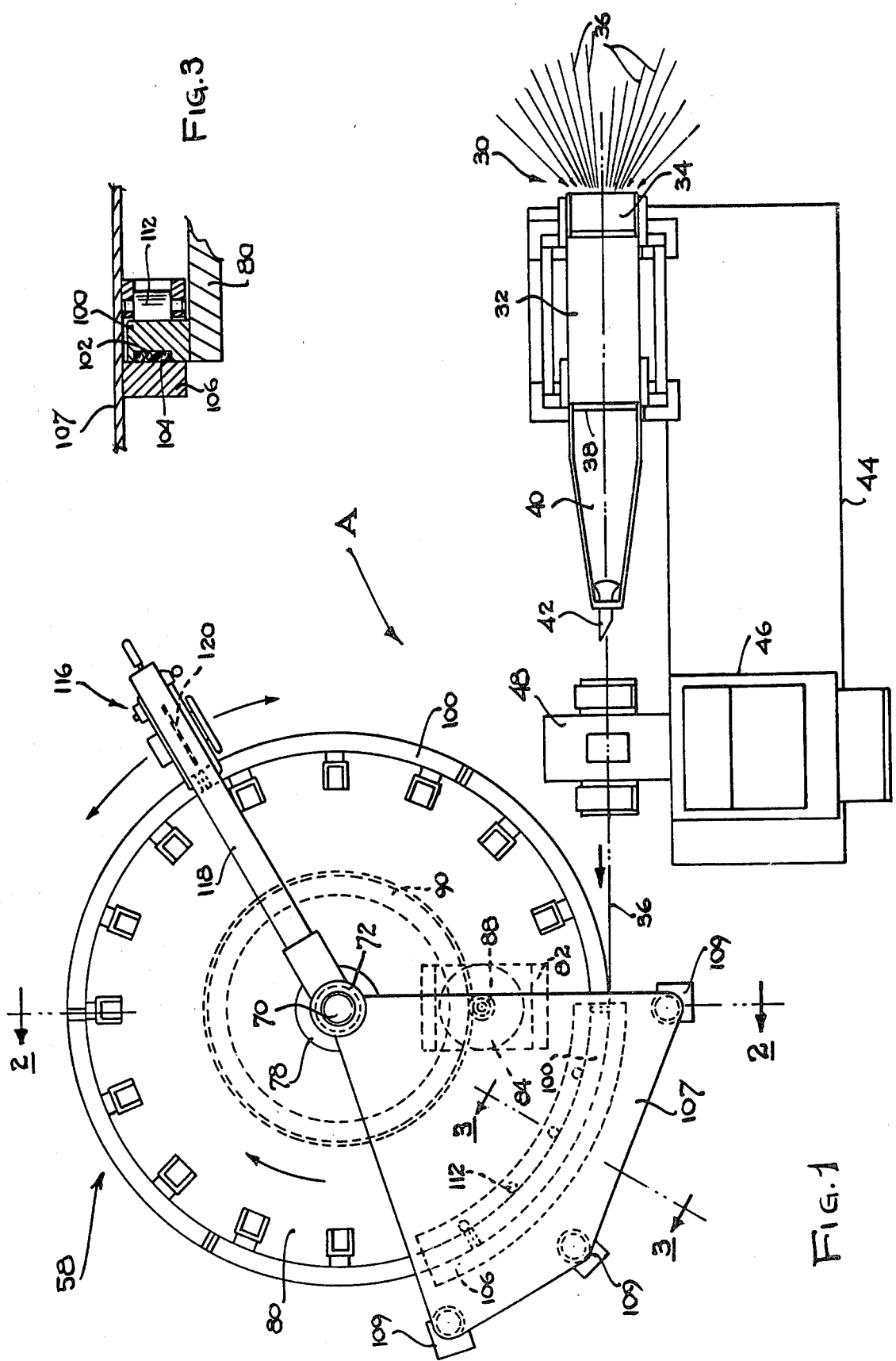
Figure 2:
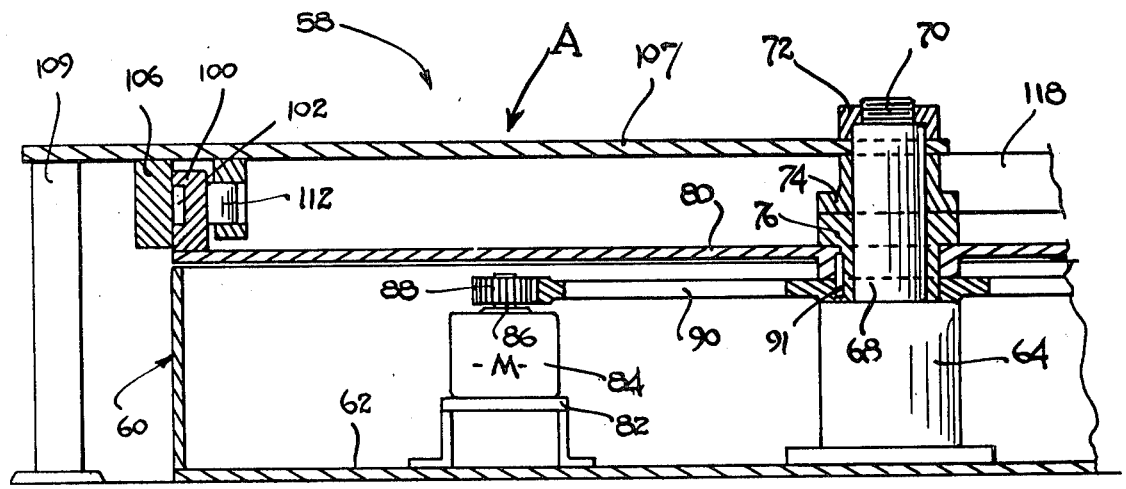
Figure 5:
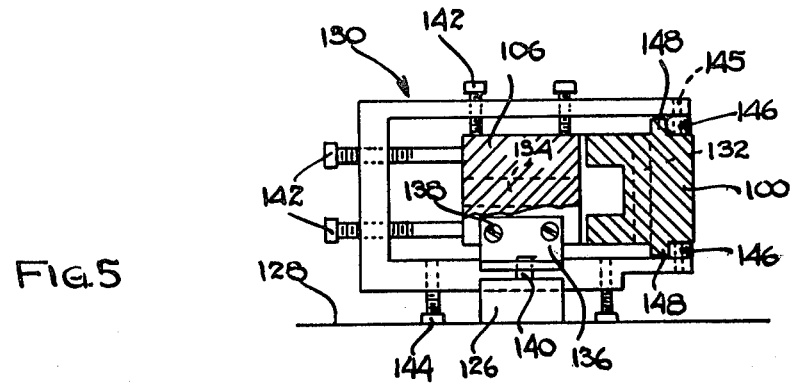
Figure 11:
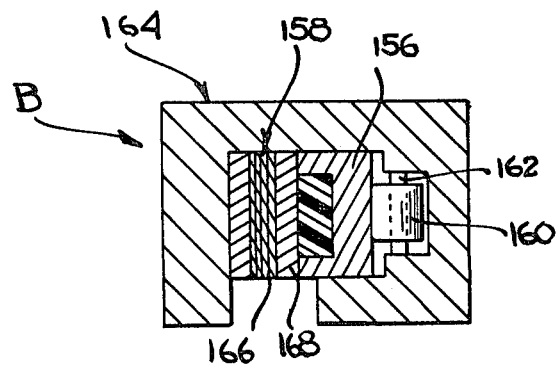
Figure 4:
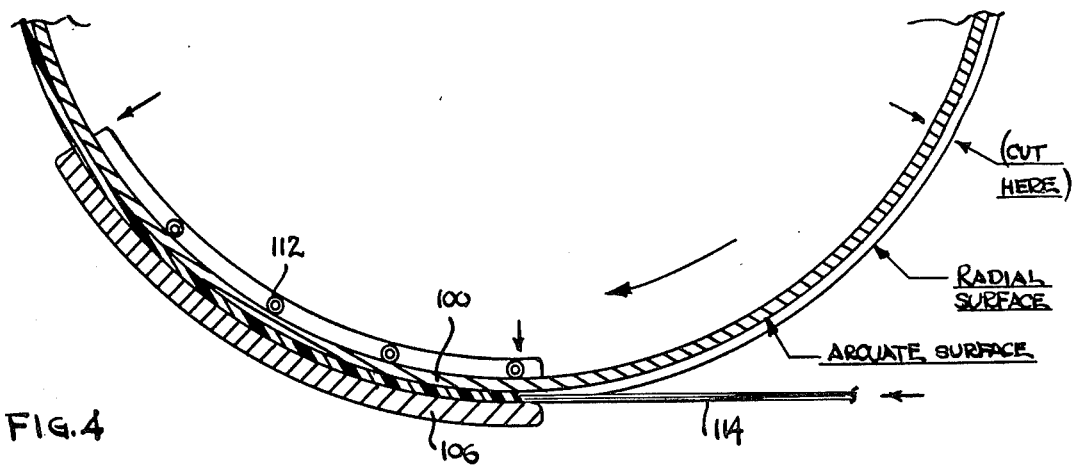
Figure 6:
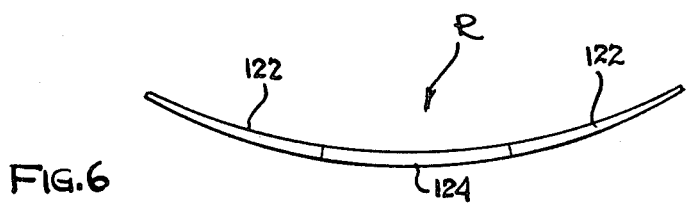
Figure 8:
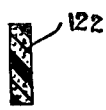
Figure 7:
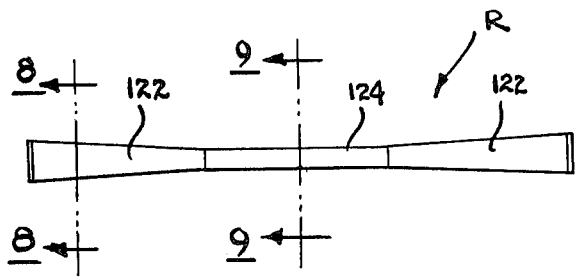
Figure 9:
Figure 12:
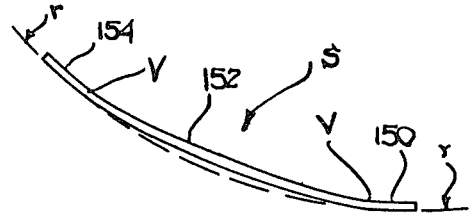
Figure 10:
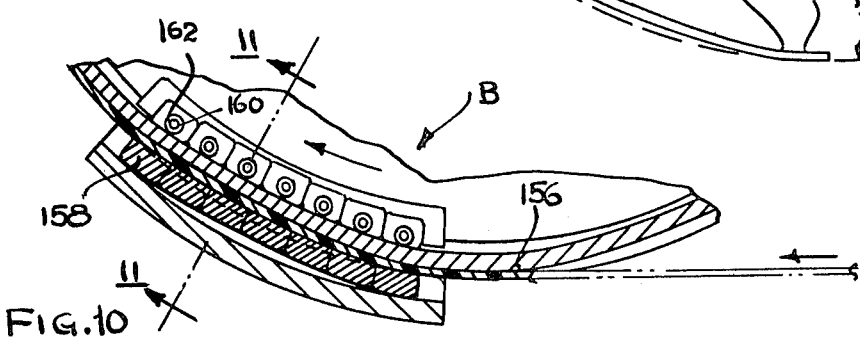
Figure 13:
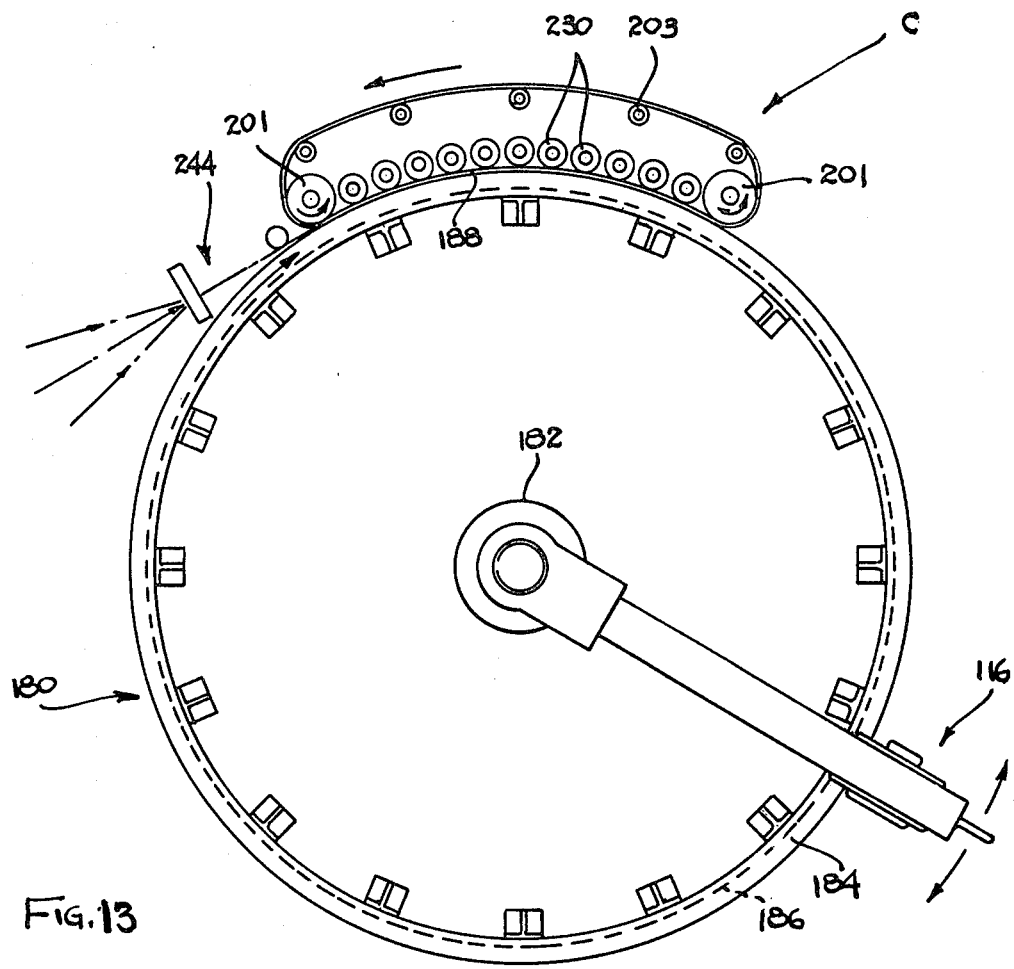
Figure 14:
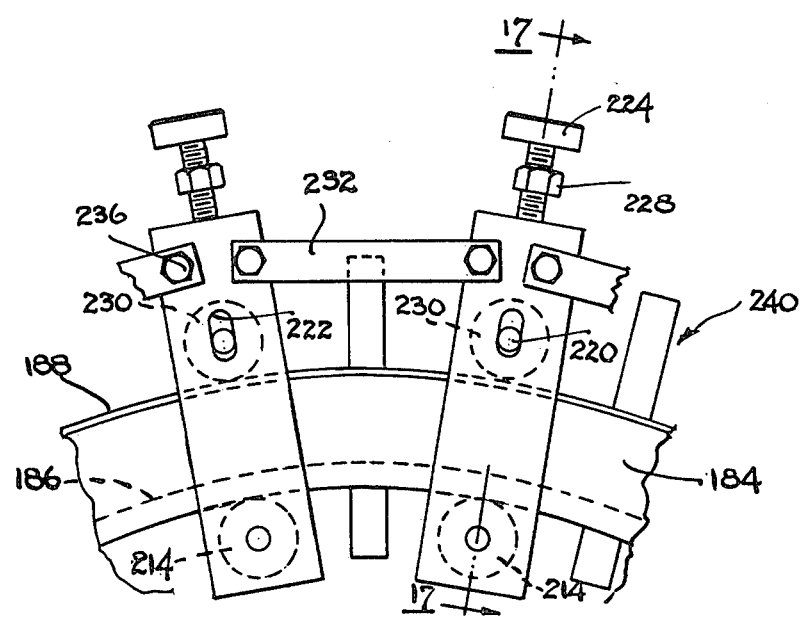
Figure 17:
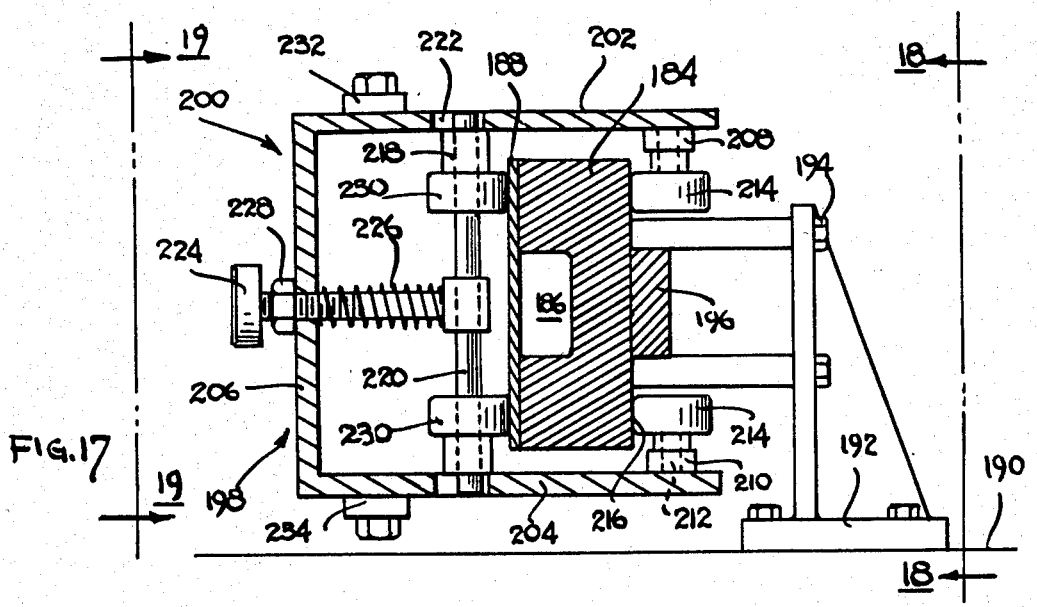
Figure 18:
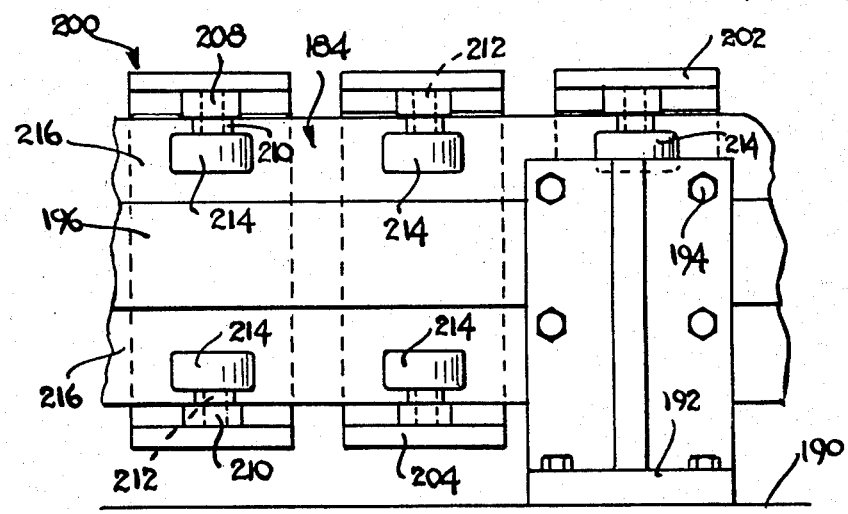
Figure 19:
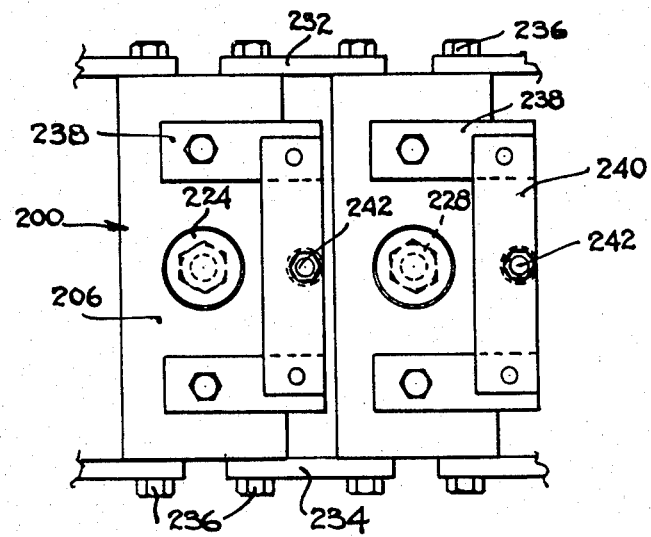
Figure 22A:
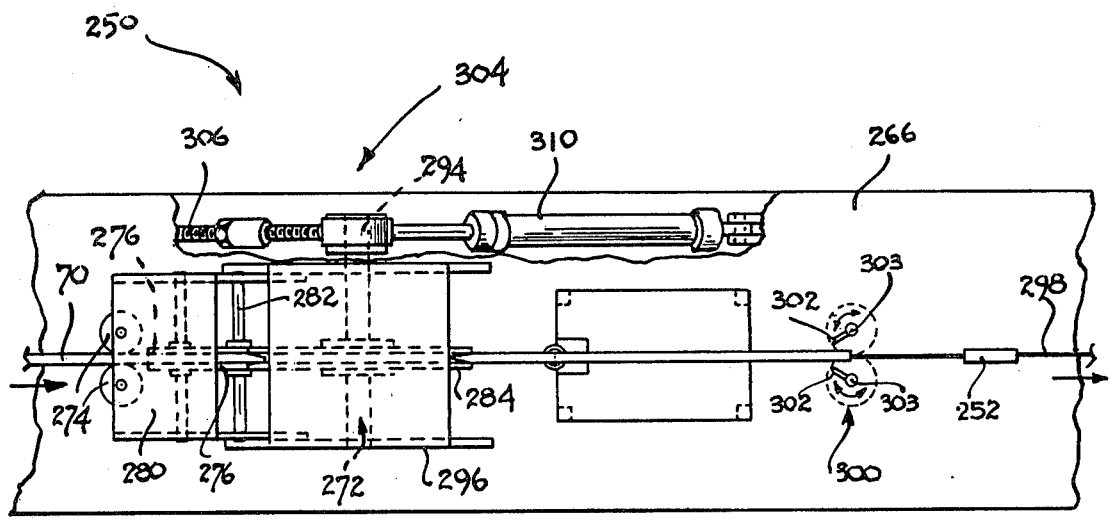
Figure 25:
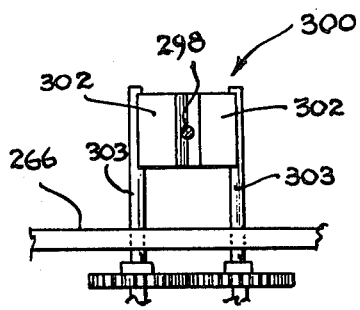
Figure 28:
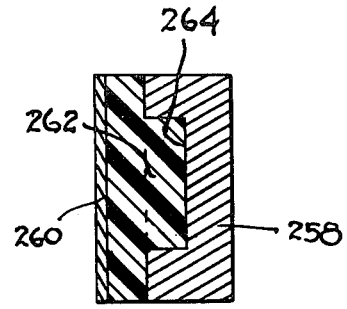
Figure 22B:
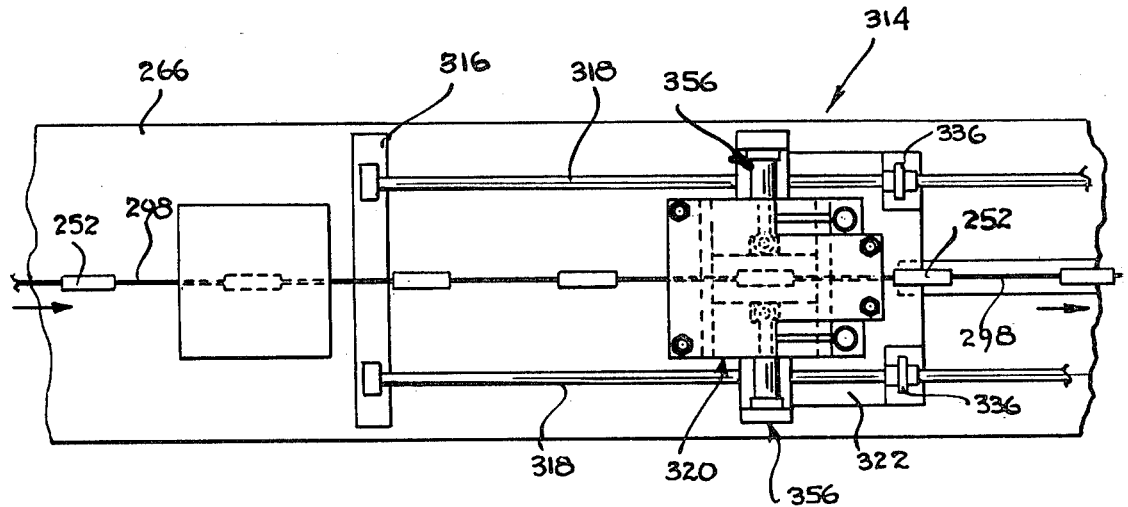
Figure 27:
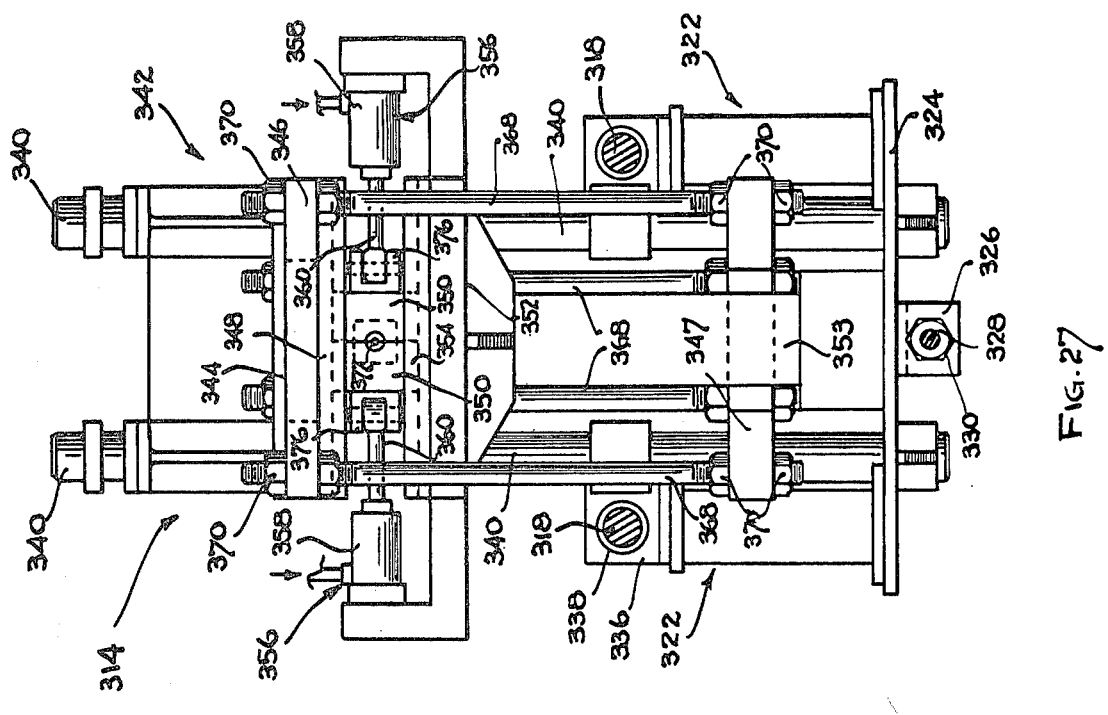
Figure 26:
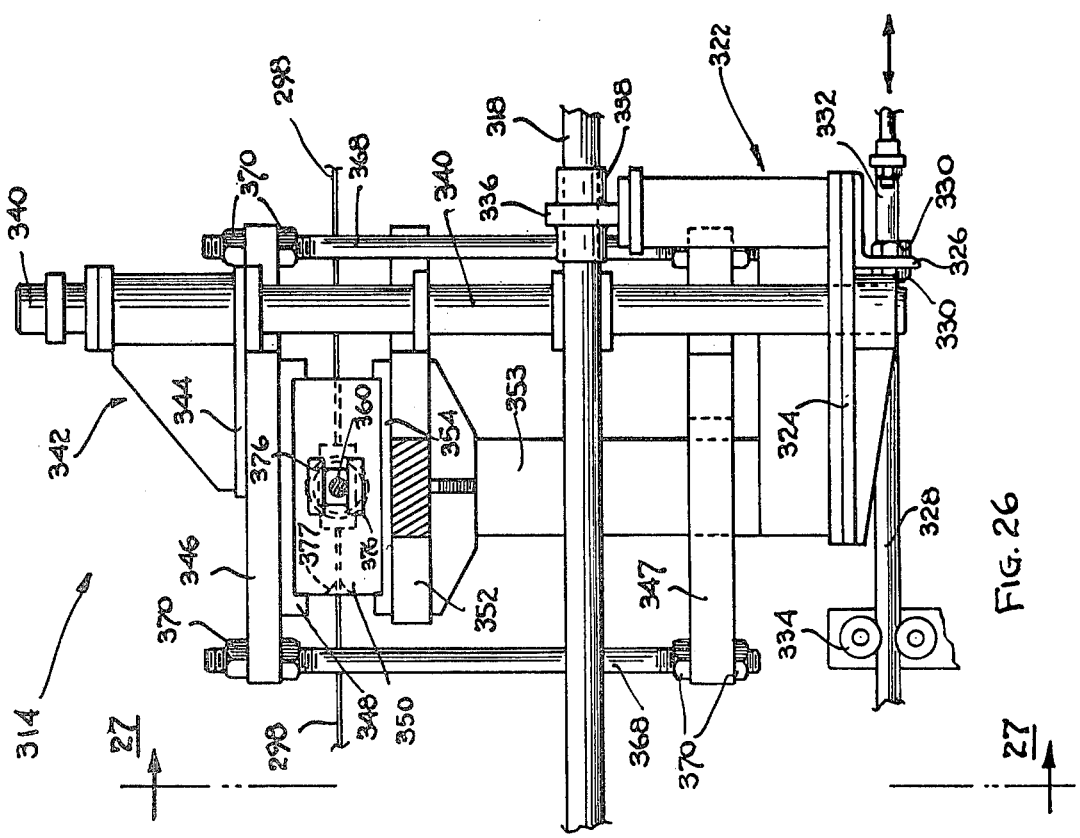

Having thus described the invention in general terms, reference will now be made to the accompanying drawings (nine sheets) in which:

FIG. 1 is a top plan view of one embodiment of an apparatus constructed in accordance with, and embodying the present invention;

FIG. 2 is an enlarged fragmentary side elevational view, partially in section and taken along line 2—2 of the embodiment of the apparatus of FIG. 1;

FIG. 3 is a fragmentary vertical sectional view, taken along line 3—3 of FIG. 1, and showing cooperation of first and second die-forming members to form a die channel;

FIG. 4 is a somewhat schematic horizontal sectional view showing a portion of the first die-forming member, such as a first die segment, and a second die-forming member, and also showing reinforcing material entering a die channel formed by said die-forming members;

FIG. 5 is a side elevational view, partially broken away and in section, of another embodiment of the apparatus of FIG. 1 and which is slightly modified to show a different means of supporting the first and second die-forming members;

FIG. 6 is a top plan view of one form of reinforced plastic composite article having a non-constant cross-sectional shape over its length, which may be produced in accordance with the present invention;

FIG. 7 is a side elevational view of the article of FIG. 6;

FIG. 8 is a vertical sectional view, taken along line 8—8 of FIG. 7, and showing a first portion of the article having a certain cross-sectional shape;

FIG. 9 is a vertical sectional view, taken along line 9—9 of FIG. 7 and showing a second portion of the article having a different cross-sectional shape;

FIG. 10 is a schematic horizontal sectional view, showing a modified form of apparatus which may be constructed in accordance with and embodying the present invention, for producing reinforced plastic composite articles, which may have non-constant cross-sectional shape, and also which are curved with a non-constant radius;

FIG. 11 is a vertical sectional view taken along line 11—11 of FIG. 10;

FIG. 12 is a top plan view of one form of article which may be produced in accordance with the apparatus of FIGS. 10 and 11;

FIG. 13 is a schematic top plan view of still another modified form of apparatus constructed in accordance with and embodying the present invention and which utilizes a continuous moveable belt as the second die-forming member;

FIG. 14 is a fragmentary top plan view showing a portion of the apparatus for biasing the continuous belt serving as the second die-forming member, into engagement with the first die-forming member to form a continuous die channel;

FIG. 15 is a horizontal sectional view, similar to FIG. 14 and showing a portion of the apparatus of FIG. 14 in more detail;

FIG. 16 is a perspective view of a portion of the continuous belt showing its engagement with the first moveable die segment and showing the exit end of the die channel formed thereby;

FIG. 17 is a vertical sectional view taken essentially along line 17—17 of FIG. 14;

FIG. 18 is a rear elevational view taken essentially along the interior of the first die-forming member, as for example, along the plane of line 18—18 of FIG. 17;

FIG. 19 is a front elevational view, showing a portion of the apparatus taken essentially along the plane of line 19—19 of FIG. 17;

FIG. 20 is a top plan view of still another modified form of apparatus constructed in accordance with embodying the present invention and capable of producing reinforced plastic composite articles of non-constant cross-sectional shape and non-constant cross-sectional volume;

FIG. 21 is a side elevational view of one form of plug generating device for forming and introducing plugs into a stream of filament containing reinforcing material for altering the volume thereof, and used with the apparatus FIG. 20;

FIGS. 22a and 22b are a composite of a partial top plan view, partially broken away, of a portion of the apparatus of FIG. 21;

FIG. 23 is a sectional view taken along line 23—23 of FIG. 21 and showing the raw plug-forming material;

FIG. 24 is a sectional view taken along line 24—24 of FIG. 21 and showing a portion of the plug material after it has been partially formed;

FIG. 25 is an enlarged elevational view of a plug material cutting mechanism forming part of the apparatus FIGS. 21 and 22;

FIG. 26 is a side elevational view of a cold briquetting die mechanism forming part of the plug generating devices;

FIG. 27 is a vertical sectional view taken along line 27—27 of FIG. 26;

FIG. 28 is a vertical sectional view showing a pair of die-forming members with a die shape capable of producing an article having a non-constant volume and showing the plug and reinforcing material in a die cavity formed by the die-forming members; and FIG. 29 is one form of article having a non-constant volume which may be produced in accordance with the present invention.

DETAILED DESCRIPTION OF PREFERRED EMBODIMENTS

Referring now in more detail and by reference characters to the drawings which illustrate several practical embodiments of the present invention, and A designates one embodiment of the apparatus for producing reinforced plastic composite articles which may have a non-constant cross-sectional shape. In this respect, FIGS. 1 through 4 illustrate the first embodiment A of the present invention, and FIGS. 6 through 9 illustrate one form of article which may be produced in accordance with the present invention.

The apparatus A uses some of the principles involved in the so-called "circular pultrusion" apparatus described in the aforesaid U.S. Pat. No. 3,873,399 to produce a non-linear composite article. Further, this apparatus may be considered to pultrude resin matrix impregnated filament containing reinforcing material through the die channel in order to produce the composite article.

The apparatus A generally comprises a resin impregnator 30 which may adopt the form of a conventional resin impregnation dip tank 32 having at its inlet end, a carding plate 34 or similar device to gather and receive strands of filament containing reinforcing material. In this respect, various individual strands 36 enter apertures in this carding plate 34 and at that point are introduced into the resin dip tank 32. Further, this tank 32 may be provided with hold-down rollers and the like, so as to thoroughly impregnate a liquid resin matrix into the filament containing strands of reinforcing material.

At the outlet end of the resin impregnator 30, a doctor blade 38 may be provided for removing excess resin from the impregnated strands and which may be accumulated within a trough 40, in the manner as illustrated in FIG. 1. The resin impregnated strands are thereupon trained through a funnel-like device 42 for purposes of gathering the impregnated strands into a mass of roving, which may have the shape of a portion of the article to be formed.

In accordance with this invention, it is possible to produce a reinforced plastic product which is formed by pultruding the product in an arcuate shape during formation thereof. The product is preferably comprised of a filament containing reinforcing material impregnated with a hardenable binder such as a curable resin matrix, and which matrix is cured to a solid form when the reinforcing material is pultruded in an arcuate path in the direction of movement thereof. In this way, it is possible to produce a rigid product, having at least a portion of its length which is arcuately shaped. Generally, the article will be cured over its entire length from end to end.

This reinforced plastic product can be further characterized in that the reinforcing material comprises filament containing strands or otherwise, the product comprises filament containing mat material. In addition, the product in one aspect of the present invention, can comprise a combination of both the mat or strand material, or web material for that matter. In this respect, it is also possible to form the reinforced plastic product with different reinforcing materials, such as for example, boron strand material and glass web material.

The final pultruded article can be made from fiber containing strand or tape material. Any of a wide variety of fiber containing web or mat or fabric materials may also be utilized. The strands of reinforcing material, or for that matter, the web or tape material may contained chopped fibers. The strand or tape or web material may be formed of any natural or synthetic continuous filament, which is capable of being bent to conform to a desired shape. The reinforcing material is commercially available in the form of rolls or spools of these materials. These rolls or spools may be rotatably supported on racks or like structures (not shown) and which are located in close proximity to the apparatus. Furthermore, these racks may be constructed as alternate feed racks to alternately feed various forms of the strand or tape material, or the web or mat or fabric material.

It should be recognized that boron filaments, graphite tow, filaments from lithium and other grown whisker crystals can be employed. In addition, metal wire may even be interspersed with some of the filament materials in the event that it is desired to add some type of metallic body to the final pultruded article. In the actual pultrusion of the reinforced composite articles, a plurality of different reinforcing materials may be employed as hereinafter described in more detail. The exact composition of the final articles will be predicated on the intended use, the size and strength requirements and like factors.

These strands of reinforcing material may be applied in the form of tapes or they can also be introduced in the form of mat material which carries longitudinally located filaments or mat material which carries the angularly located filaments as aforesaid. Any other form of combination can be utilized in accordance with the present invention.

These various reinforcing materials, mentioned above, may be impregnated at the site of apparatus A, or they may be commercially purchased in preimpregnated form. In many cases, it will be desirable to impregnate the reinforcing materials during the pultrusion operation in order to obtain better control over the resin impregnation.

The resin matrix impregnating member may be any suitable type of resin matrix impregnator, such as the dip tank which merely contains a liquid resin material. In this case, the mat or web material and the strand material are passed into the dip tank during movement for resin impregnation of the fibrous elements in these strands, tape and mat or web materials. Otherwise, a resin matrix impregnating canister could also be employed in which the resin matrix material is forceably impregnating into the reinforcing material. The impregnating canister would be designed to forceably introduce the resin matrix into the reinforcing material by pressure, or sonic energy or other forms of driving force.

Any of a number of commercially available resin matrix compositions can be used for impregnating the reinforcing materials such as the strand or mat material. The matrix should be capable at some stage of the process, of being liquified and softened for a period of time, and also should be sufficient to flow around the filaments forming the strands and the mat and web material. In addition, the matrix should be capable of achieving a rigid state of complete polymerization to become a rigid solid member with the reinforcing material and should also possess ability to adhere to the reinforced material. Some of the suitable thermoplastic resin matrix materials which can be employed for impregnating the reinforcing materials are resins such as polypropylene, polycarbonates, and the like. In addition, some thermosetting resins, such as phenolics, epoxy type resins and various polyesters may also be used. These polyesters are preferably the condensation products from phthalic anhydride, maleic anhydride, ethylene or propylene glycols with a styrene or diallyl phthalate monomer. Generally, the thermosetting resins should be capable of being fused into an insoluble, non-heat softening mass upon application of heat or similar method of triggering the catalytic system. Other binders which may be used are hard waxes, eutectic ceramics, eutectic metals, synthetic rubbers and the like.

In many cases, it may be desirable to introduce a particulate matter into the resin matrix and reinforcing material composite. This particulate matter is desirable in some cases in order to provide the desired reinforcing characteristics and even ethestic appearance. The particulate matter can also be used as an economizer in that it reduces the necessary amount of the more costly resin matrix and/or reinforcing material used to make a pultruded product. There are a number of particulate materials which can be employed in the formation of the pultruded articles of the present invention and include, for example, sand, particulate silica, and small hollow spheres of various materials. These articles of the present invention can be produced with a wide variety of particle sizes of the particulate matter, and particularly, large particles in the range of 8 to 64 mesh and smaller particles in the range of 100 mesh to 5 microns. The amount of particulate matter can be programmed according to the amount of strand or tape and mat or web delivered.

Mounted on a support frame 44, which also carries the resin impregnator 30, in the manner as illustrated in FIG. 1, is a dielectric pre-heating or pre-curing housing 46 which enables an electrode assembly 48 to generate a pre-curing radiation. The electrode assembly 48 is located to receive the resin matrix impregnated reinforcing material. The pre-heating electrode assembly 48 is provided with a source of dielectric energy from a dielectric energy generator (not shown) in the housing 46. The pre-heating housing would include an internal resonance cavity and would be properly shielded.

By utilizing both the pre-heating which is provided by the pre-heating housing 46, and the final heating environment, as hereinafter described, an augmented cure, similar to that described in U.S. Pat. No. 3,556,888, dated Jan. 19, 1971 can be achieved. It has been found in connection with the present invention, that this augmented curing of a resin matrix impregnated reinforcing material permits a complete cure of the resin matrix without overcuring and also enables substantially higher running rates. In addition, this form of augmented curing significantly increases the scope of raw materials which can be used to form the end product.

The dielectric pre-heating, or pre-curing mechanism of the present invention will operate with both radio frequency energy and with microwave energy. The radio frequency generator will generate energy within a frequency range of approximately 13 megahertz to approximately 100 megahertz, and preferably within the range of approximately 13 megahertz to approximately 82 megahertz. The microwave generator will generate energy within the range of approximately 920 megahertz to approximately 25,000 megahertz. Accordingly, the term "dielectric" as used herein will generally refer to both radio frequency energy in the stated frequency range of approximately 13 megahertz to approximately 100 megahertz, and microwave energy in the stated frequency range of approximately 920 megahertz to approximately 25,000 megahertz.

While the theory of microwave and radio frequency curing is not completely understood, it is believed that the curing, in part, occurs, by molecular interaction, and particularly, molecular friction. The molecules of the resin have apolar structure, such that when an electrical field is introduced across the molecules of the resin, the molecules will tend to orient in the direction of the field. After release of the field, the molecules will attempt to re-orient back to their original direction. Ths action is believed to create a frictional effect between the molecules and thereby product heat in the resin matrix.

Furthermore, the employment of dielectric pre-heating is also believed to be significant in the present invention in that this type of pre-heating enables the initiation of the cure at the center of the mass. In this respect the pre-heating may not generate a cure or even a pre-cure as such since the amount of heat applied is less than that required to cure the resin matrix. However, in the case of the polyesters, for example, a pre-cure may actually be initiated. Therefore the term "pre-heating" may also encompass pre-curing in certian compositions. Inasmuch as the thermal conductivity of the resin fiber composite allows the surface heat to dissipate, the surface of the mass will cool slightly with respect to the remainder thereof. Accordingly, the center of the mass achieves a given temperature prior to the surface of the mass. In this manner, the pre-heating or precuring will actually begin from the center of the mass. Accordingly, any outgasing of air which may be entrained in the composite does not create any fissures or cracks.

The ability of the resin matrix to accept the electrical energy is dependent upon the electrical loss tangent of the resin system. Accordingly, the resins are selected with a proper electrical loss tangent for use in the dielectric pre-heating system of the present invention. Generally, the thermosetting resins mentioned above are preferred since they all have the proper electrical loss tangent for use in this system. The resins all have a high electrical loss tangent in the monomeric form, and a low electrical loss tangent in the polymeric form. The electrical loss tangent is actually affected by the dielectric strength of the material, and the heat dissipation factor of the material. In this manner, the pre-heating or pre-curing process is self limiting, so that the resin matrix essentially cannot be overcured.

When the conductive or semiconductive fibers, such as boron, etc., are used in the reinforcing material it may be desirable to employ an inductive type of augmented cure, such as the augmented inductive type of curing system as taught in U.S. Pat. No. 3,960,629 date June 1, 1976 to William B. Goldsworthy.

It has also been found in connection with the present invention that the use of dielectric pre-heating or pre-curing, along with a final curing as defined herein, enables a substantially higher running rate in the production of the pultruded article. In addition, it has been found in connection with the present invention, that the employment of dielectric pre-heating or pre-curing enables the pultrusion of articles with essentially no cracks or voids, where other heating techniques result in a high loss rate by vitue of inclusion of cracks and voids.

Referring now to FIGS. 1 and 2, the pre-cured composite material is introduced into a pultrusion station which comprises a pultrusion machine 58. The machine 58 generally comprises a base structure 60 including a base plate 62 and a central upstanding cylindricaly shaped housing 66. The king post 68 is provided with a diameterically reduced upper end 70 extending outwardly of the housing 60. A cap 72 is concentrically disposed about the upper end 70 and is threadedly secured thereto. The radially extending arm 118 of a travelling cut-off saw (hereinafter described in more detail) has an enlarged inner end 74 disposed about the king post for rotatable movement thereabout, and thereby functions as a bearing for the arm 118, the enlarged end 74 rests upon a main bearing sleeve 76 disposed about the king post 68.

Retained between the cap 72 and the bearing 74 and being rotatable about the king post 68 is a main die supporting plate 80 which supports the first die-forming member 100 in a manner to be hereafter described in more detail. Also mounted on the base frame 60 is a horizontally disposed motor supporting plate 82 which suitably supports an electric or hydraulic motor 84 or similar drive member. The motor has an upwardly extending drive shaft 86 which, in turn, carries a drive pinion 88. In this case, the drive pinion 88 is engaged with a mating drive gear 90 carried by and rotatable with the bearing sleeve 76. The ring gear 90 is secured to an inner flange on the plate 88 by means of a key 91. The die supporting plate 80 may also be supported at its outer periphery and on its underside by means of roller (not shown) which could be in turn, supported on an additional support plate.

Referring now to FIG. 3, it can be observed that a first die-forming memeber 100 or so-called "die segment" and which is often referred to as a "female" die, is mounted on the die supporting plate 80. The die segment 100 is provided with a recess 102 having filament containing reinforcing material 104 located therein, in the manner as illustrated in FIG. 3 of the drawings. This reinforcing material 104 includes the strands 36 which are binder impregnated. The first die-forming member 100 cooperates with a second die-forming member 106 which, in this case, may be a fixed die. It can be observed that the fixed die 106 has a vertically disposed flat face which engages a mating flat face of the female die segment 100 so as to form a die channel from the recess 102.

The top plate 80 supports the first die-forming member 100 as aforesaid. The second die-forming member 106 is effectively suspended from plate 107, often referred to as a "bonnett plate" as more fully illustrated in FIGS. 1 and 2 of the drawings. The bonnett plate is secured at its inner end to the king posts 68, and at its outer end is supported on three upstanding posts 109. The cap 78 may be secured to the upper end of the king post 68 as aforesaid and retains all of the components mounted or supported thereby.

The die channel 102 does not have to have a constant cross-sectional shape over its length. In this respect, the channel 102 may extend for the entire length of the first die-forming member 100 or only a portion of the length thereof. In either case, it may have a first section of a different cross-sectional shape than a second portion thereof. FIG. 16, for example, illustrates one form of die channel which may be used. The exit portion of the die channel is illustrated in FIG. 16. However, it can be observed that the recess and hence the die channel 102 has a first portion 108 which is of a lesser thickness than a second portion 110 of the die channel 102. However, the second portion 110 of the die channel which has a greater thickness, has a lesser depth than the first named portion 108. This form of die channel could easily produce an article of the type illustrated in FIGS. 6 through 9 of the drawings, as hereinafter described in more detail.

Referring now to FIG. 4, it can be observed that the female die segment 100 is moveable and is urged against the male die 106 which is fixedly mounted by means of a plurality of rollers 112. It can also be observed that the filament containing reinforcing material which is preferably binder impregnated enters as a cord 114 into the entrance of the die channel so that it is essentially tangent to the first die-forming member, in the manner as illustrated in FIG. 4.

As the first die-forming member moves in an arcuate path, in the direction of the arrow, as shown in FIG. 4, and relative to the fixed die 106, it will move with it the reinforcing material located in the die channel 102. Further, either one or both of the die-forming members is provided with a final heating means or curing means which will cause the binder, such as the resin matrix, to proceed to a final or so-called "C-stage" cure. As this occurs, the reinforced plastic material will be completely hardened to thereby create the final article. Further rotation of the first die-forming member 100 in the direction of the arrow, shown in FIG. 4, will cause the portion of the die channel which has the cured reinforced plastic material therein, to move away from the fixed second die-forming member 106. As this occurs, the hardened final reinforced plastic composite article can be easily removed from the die channel 102. Generally, the article can remain within the die channel for further curing, if desired, and removed at the point designated as "cut" in FIG. 4.

Referring again to FIG. 1, it can be observed that the apparatus may be provided with a traveling cut-off saw 116, which is mounted on the king post 68 and is provided with a radially extending arm 118. At its outer end, a saw mechanism 120 is provided. In this case, the traveling cut-off saw is capable of moving in an arcuate path, in both directions of the arrows as shown in FIG. 1. Inasmuch as the first die-forming member may be continuously rotated, the traveling cut-off saw, at the desired point, starts moving, and also severs a portion of the reinforced plastic composite article from the portions still remaining in, or initially being removed from the die channel. After the cut has been made, the traveling cut-off saw 116 is returned to its initial position where it is then capable of being moved to initiate a further severing of the next portion of the composite article which is being produced.

The movement of the traveling cut-off saw 116 can be easily electrically controlled to the rate of rotation of the first die-forming member and hence, the rate of reproduction of the reinforced plastic articles. In other words, it can be observed that each of the articles are produced as a continuous integral unit as the stock of material is removed from the die channel and therefter severed by the saw into individual discreet articles.

FIGS. 6 through 9 illustrate one form of reinforced plastic composite article which may be produced in accordance with the present invention, as aforesaid. In this case, the article designated by reference letter R may adopt the form of an automotive vehicle leaf spring. It can be observed that the leaf spring R has a first end section 122 which essentially has a shape imparted by the first section 108 of the die channel. It can be observed that this end section 122, at least in a portion thereof, has a relatively thin transverse dimensional thickness and a relatively tall vertical dimension. Conversely, a second section 124 of this article, integral with the first section 122, and which has a shape imparted by the section 110 of the die channel, is much shorter in the vertical dimension and much thicker in the transverse dimension.

It should be understood that this type of article, such as the automotive vehicle leaf spring, is only one form of article which can be produced in accordance with the present invention. By varying the shape of the dies, it is possible to produce a large number of reinforced plastic composite articles which have a non-constant cross-sectional shape throughout their length, that is, from end to end.

Referring now to FIG. 5, there is illustrated a modified means for mounting the first die-forming member 100 and the second die-forming member 106. In this embodiment of the invention, a mounting block 126 is mounted on a supporting surface as, for example, the supporting plate 80. Alternatively, the mounting block 126 could be secured to a plate 128 which would be, in turn, secured to the supporting plate 80. Also carried by the mounting block 126 is a generally C-shaped bracket 130, which effectively carries the first die-forming member 100 and the second die-forming member 106. In actual construction, a plurality of circumferentiallly spaced apart C-shaped brackets 130 would be used to carry the two die-forming members, although only one such bracket and its arrangement with the die-forming members has been illustrated and described.

In the embodiment of the invention as illustrated in FIG. 5, the first die-forming member may be provided with a plurality of vertically located cartridge heaters 132 and which are connected to a suitable source of electrical power by suitable current carrying conductors (not shown). Further, if desired, the second die-forming member 106 may similarly be provided with internal bores adapted to receive cartridge heaters 134 and which are connected to the suitable source of electrical power. These cartridge heaters 132 and/or 134 are designed to provide the final curing radiation to the binder which has been impregnated in the reinforced plastic composite material.

The second die-forming member 106 is secured to the mounting block 126 through and L-shaped retaining bracket 136 and which is bolted to transverse sides of the die-forming member 106 by means of bolts 138. The horizontally disposed leg of the retaining bracket 136 is retained on an upstanding pin 140 which projects upwardly from the mounting block 126. This pin 140 extends into an elongate aperture formed in the horizontally disposed leg of the bracket 136. The C-shaped brackets 130 are in one sense effectively adjustably carried by the fixed die 106 by means of a plurality of adjustment screws 142 which permits adjustable positioning of at least the fixed die. Additional adjustment screws 144 extend from the upper surface of the plate 128 and into the C-shaped brackets 130 in order to adjustably position the brackets 130 in the manner as also illustrated in FIG. 5 of the drawings.

The C-shaped brackets 130 are also provided at their inner ends with vertically disposed pins 145 for journalling upper and lower guide rollers 146. These rollers 146 are located to bear against and ride along rearwardly presented surfaces of integrally formed upwardly and downwardly struck flanges 148, also in the manner as illustrated in FIG. 5 of the drawings. In accordance with the above outlined construction, it can be observed that the pair of die-forming members are held in close engagement with each other, but can be adjustably positioned so as to adjust the amount of sliding friction which occurs between the faces of the two die-forming members. Further, they cannot separate from each other but can be automatically positioned to also compensate for any non-linearities across the lengths of the respective dies.

The above described embodiment of the apparatus is designed to produce reinforced plastic composite articles which may have a non-constant cross-sectional shape throughout their length and which are arcuately shaped, and which also have their arcuate shape defined by a constant radius. It is also possible to produce a reinforced plastic composite article which may have a non-constant cross-sectional shape over its length and which may be also arcuate in its shape, but have a non-constant arcuate shape. In other words, this reinforced plastic article may have different portions represented by different radii. FIGS. 10 and 11 of the drawings illustrate an embodiment of the apparatus, designated by reference letter B, and which is capable of producing an article designated as S in FIG. 12 of the drawings.

Referring first to the article in FIG. 12, it can be observed that this article has a first portion 150 which is arcuate in shape and defined by a radius r. This article S has a second portion 152 which is also slightly arcuate in shape, but defined by a different radius, designated as v, and a third portion 154 which is effectively defined by the same radius v at the other end of the section 152. In this case, the article may have a non-constant cross-sectional shape, as aforesaid, and for example, could adopt the cross-sectional shape of the article R, as illustrated in FIGS. 6 through 9. However, in this embodiment of the invention, the apparatus is designed to produce an article of constant volume throughout its length. Here again, a large number of articles of various cross-sectional shapes could be produced. In like manner, the apparatus is designed to produce overall shapes of articles, which can differ substantially from that illustrated in FIG. 12, merely by varying the types of dies which are employed.

Referring now to the apparatus B which is more fully illustrated in FIGS. 10 and 11, it can be observed that the apparatus B comprises a first die-forming member 156 and a second die-forming member 158 which are respectively similar to the die-forming members 100 and 106, respectively. The die-forming member 158 may be substantially identical to the die-forming member 106 which is essentially fixed and is not moveable with the die-forming member 156. The first die-forming member 156 is provided with a recess in order to form a die cavity with the die-forming member 158 in order to receive the filament containing reinforcing material as shown. However, in this case, the die-forming member 156 may be slightly flexible so as to assume different arcuate shaped portions. In this case, it can be observed that the die-forming member 156 is supported on its rearwardly or interiorly presented surface by means of a plurality of follower rollers 160. These rollers 160 are each mounted on a vertically disposed roller supporting shaft 162. Moreover, the shafts 162 are capable of being biased slightly in a direction away from, or toward, the second die-forming member 158. Suitable adjustment devices (not shown, but which could be simple adjustment bolts) could be provided for this purpose. In any event, it can be observed that by locating the rollers 160 in a desired position, various arcuate shapes can be achieved in accordance with the present invention.

With further reference to FIG. 11, it can be observed that the die-forming members 156 and 158 are suitably retained within an inverted U-shaped housing 164. In this case, the roller shafts 162 which carry the rollers 160 would be suitably journalled within a portion of the housing 164 in the manner as illustrated in FIG. 11.

By further reference to FIG. 11, it can observed in this particular embodiment of the invention, that the second die-forming member is actually a laminate structure comprised of a plurality of glass reinforced Teflon layers 166 which are provided on opposite surfaces with 0.015 inch thick stainless steel outer layers or so-called 'shoes' 168. Thus, in this case, one of the shoes will serve as a outer surface of the second die-forming member 158. This type of die-forming member has been found to be highly effective in resisting the abrasive effects, and also yielding to non-linearities which may be a result of imperfect positioning of the rollers 160. This type of die-forming member has been found to be sufficiently resilient in order to conform to the slight non-linearities, but nevertheless sufficiently rigid, so as to maintain the integrity of the die channel.

FIGS. 13 through 19 illustrate another embodiment of the apparatus, designated by reference letter C, and which has been found to be highly effective in producing reinforced plastic composite articles. The apparatus C generally comprises a main supporting frame 180 and which also has a center king post 182 in a manner similar to the apparatus A. The main housing 180 also carries a generally cylindrically shaped first die-forming member 184 which may be substantially identical to the die-forming member 100 and constitutes a first die segment.

The first die-forming member 184 is similarly provided with a peripherally extending recess 186 which together with a second die-forming member 188, as illustrated in FIG. 15, and hereinafter described in more detail, forms a die channel. The housing 180 is suitably provided with a motive means (not shown) to cause rotation of the die-forming member 184, much in the same manner as described in connection with the apparatus A.

The structure which supports the die-forming members is mounted on a main supporting plate 190 which is located on the upper surface of the main housing 180. The structure includes a plurality of gusseted brackets 192 which are bolted to the upper surface 190 and are located in a circular arrangement near the periphery thereof. These gusseted brackets 192 are each provided with a plurality of bolts 194 for securement to a retaining plate 196 on the inwardly presented surface of the first die-forming member 184. The bolts 194 are threaded so that they can provide for slight adjustable positioning of the first die-forming member 184.

The second die-forming member 188 is in the form of a continuous belt which, in this embodiment, is continuously moveable with the first die-forming member and at the same rate of speed. The continuous belt may be formed of a material which is capable of being trained around a plurality of rollers and is hereafter described. However, it must be sufficiently rigid so as to be disposed over a portion of the recess in the first die-forming member 184 to form the die cavity and maintain the integrity of the die cavity.

A separate supporting structure 198 is provided for supporting the second die-forming member 188 and retaining the two die-forming members 184 and 188 in the assembled position to maintain the integrity of the die channel. This separate supporting structure 198 is suitably mounted on a housing or similar platform (not shown). The supporting structure 198 is comprised of a plurality of C-shaped brackets 200 which are arranged in an arcuately shaped continuous pattern to support the die-forming member 188, much in the manner as illustrated in FIG. 13 of the drawings. The portion of the belt not in engagement with the die-forming member 184 is supported by end rollers 201 and rearwardly located rollers 203.

One of the C-shaped brackets 200 is more fully illustrated in FIGS. 14, 15 and 17 of the drawings and comprises a top plate 202 and a bottom plate 204 connected by an end plate 206. Located on the right-hand end of each of the brackets 200 (reference being made to FIG. 17) are upper and lower bosses 208 which are provided with bearings 210 to suitably retain roller shafts 212 and which, in turn, carry upper and lower rollers 214. These rollers 214 are designed to bear against upper and lower roller surfaces 216 on the rearwardly presented surfaces of the die-forming member 184. Also carried by the upper and lower plates 202 and 204 of each bracket are bearing structures 218 which suitably journal a vertically disposed roller shaft 220. The bearing structures or otherwise the shafts 220 many project through an elongate slot 222 on the upper plates 202. Moreover, the vertically disposed plate 206 carries a threadedly adjustably positionable bolt 224 which bears against the roller shaft 220, in the manner as illustrated in FIGS. 14-17. A spring 226 is disposed about the shank of the bolt 224 and is interposed between the plate 206 and the roller shaft 220. Furthermore, a locking nut 228 is also disposed on the bolt shank, in the manner as illustrated in FIG. 16.

Mounted on the roller shafts 220 of each bracket assembly 200 are upper and lower rollers 230 which are located to bear against the interiorly presented surface of the continuous belt which functions as the die-forming member 188. It can be observed that the amount of pressure through which the die-forming member 188 engages flat surfaces of the die-forming member 184 can be adjusted through the various bolts 224.

Each of the C-shaped brackets 200 are interconnected through an upper and lower series of retaining sectors 232 and 234 and are suitably secured by means of bolts 236. Each of the flat vertically disposed plates 206 of each of the C-shaped brackets 200 are also provided with mounting plates 238 for holding cartridge heater assemblies 240. Each of the cartridge heater assemblies 240 are, in turn, provided with horizontally located cartridge heaters 242. These cartridge heaters may be connected to any suitable source of electrical power (not shown) for energizing the same.

Due to the fact that the die cavity is of non-constant cross-sectional shape over its length, no separate puller member is required. The die cavity and the associated female die segment serve as the puller mechanism as well. Further, this particular die cavity imparts the shape and size to the final pultruded article after the latter has been cured within the die cavity. The first die-forming member is also effective to orient the incoming fibrous containing reinforcing material into the die cavity, and in initially changing the shape.

The embodiment of the apparatus C is highly unique in that loads are not carried into the structure. All of the loads are carried on the various pairs of rollers which basically support the die-forming members and holds them in their mated relationship. The use of the belt as a second die-forming member is also highly effective in that it is able to follow essentially any contour. Consequently, this embodiment of the apparatus is highly effective in forming articles which have non-constant radius, as well. In addition, there is no "sloughing" problem of two mating dies rubbing against each other. One of the other advantages of the use of the belt is that it can be embossed on the surface which engages the reinforcing material. In this way, the surface effect of the belt can be imparted to the surface of the reinforcing material and retained therein when the binder in the reinforcing material is finally cured.

The apparatus may be provided with a roller structure and comb structure 244 for guiding and properly locating the incoming matrix impregnated strands of reinforcing material into the die cavity.

This embodiment of the apparatus C is similarly provided with a traveling cut-off saw 116, similar to that type of cut-off saw employed in the apparatus A.

As indicated previously, the resin impregnated reinforcing material is pulled through the pre-heating device where a heating of resin matrix impregnated into the reinforcing material is initiated. The amount of energy which is introduced into the composite mass is carefully controlled so that a cure of the resin matrix is not completed. In addition, the amount of energy is controlled with respect to the running rates of the feed material, and with respect to the distance between the preheating housing and the die cavity.

After the material is introduced into the die cavity, the shape of this die cavity is imparted to the impregnated reinforcing material. Furthermore, the resin matrix impregnated into the reinforcing material will be finally and fully cured while in the die cavity. By using this type of augmented curing, it has been found that it is not necessary to employ dielectric energy curing in the final curing environment. The dielectric pre-heating has advanced the resin matrix to a point where only a slight amount of additonal heat is necessary to completely cure the resin matrix in the final curing.

FIGS. 20-27 illustrate an embodiment of the apparatus D which is capable of producing reinforced plastic composite articles having non-constant cross-sectional shape over their length and which may also have non-constant cross-sectional volume over their length. FIG. 29 is representative of one such article which can be produced in accordance with this embodiment of the apparatus and method.

The apparatus D is in many ways very similar to the apparatus C, except that it employs a plug-generating device 250, which is more fully illustrated in FIGS. 21-27. The plug-generating device is designed to form a plurality of individual spaced-apart plugs 252 which are carried on a continuous connecting cord 298 hereinafter described in more detail. By further reference to FIG. 20, it can be observed that the various plugs on the connecting cord 298 are introduced into a stream of binder impregnated filament containing reinforcing material 256. In this way, the continuous stream of binder impregnated reinforcing material, along with the plugs on the connecting cord, are introduced into the die cavity. In this case, the plugs of material would be spaced apart on the connecting cord 298 and properly interspersed within the strands of reinforcing material, so that the plugs would be located in portions of the die cavity which have a larger volume.

Referring to FIG. 28, for example, there is illustrated one form of first die-forming member, e.g. a female die segment 258 cooperating with a second die-forming member, e.g. a male die 260, such as the continuous belt. In this case, the pair of die-forming members 258 and 260 cooperate to form a die channel 262. It can be observed that the die channel 262 has an enlarged segment 264 located within the first die-forming member 258. It can also be observed that when the filament containing reinforcing material introduced into the die channel 262 is hardened, it will form an article T of the type illustrated in FIG. 29. In this case, the enlarged hump portion of the article would be produced in the enlarged recess portion 264 of the die cavity 262.

It should be understood that this form of die cavity is only one which could be used in accordance with the present invention to produce reinforced plastic composite articles having non-uniform cross-sectional volume over their length. It should also be understood that a plurality of recesses of the type similar to recess 264 could be located in the die channel and the plugs would be properly located and spaced apart from each other so as to be properly positioned in the various recesses 264. The apparatus D effectively relies upon the apparatus C, as illustrated, and generally includes all of the apparatus C with the exception that the first die-forming member has been replaced by one which is capable of receiving different volumes of material over its length.

The plug-generating device 250 generally comprises a main supporting table or frame 266. Mounted on the upper surface of the frame 266 is a material supply spool 268 which carries a supply of plug-forming material and which dispenses same and thereby provides a continuous "rope" 270 of this material in the manner as illustrated in FIG. 21. The continuous cord or so-called "rope" of plug-forming material is preferably a bulk molding material which is capable of being formed into a plug of the desired size and shape.

The bulk molding compound may be a polyester material which is somewhat moldable and may contain fiber reinforcing material, as, for example, chopped glass, in order to have a putty-like consistency. The plug is provided with sufficient material so that it will roughly contain the same volume of material as is needed to fill an enlarged recess portion in the die cavity, as previously described.

The rope of bulk molding material is introduced into a forming roller mechanism 272 which functions as a type of molding die for molding the rope of bulk molding material. In this case, a pair of vertically disposed rollers 274 engage the opposed sides of the rope. Further, the rope of material is immediately thereafter trained between a pair of rollers 276 which are horizontally disposed, that is, they are adapted for rotation about axes in generally horizontal planes. In this case, it can be observed that the two pairs of rollers 274 and 276 generally shape the rope of bulk molding material both horizontally and vertically.

The rollers 274 are mounted on pins 278 which are suitably retained on a housing 280, the latter being disposed on the upper surface of the frame 266. In like manner, the rollers 276 are supported on roller shafts 282 which are also mounted on the frame 280. It can also be observed that the rollers 276 have relatively deep grooves so as to cause a shaping of the rope of bulk molding material as it passes between the two rollers 276.

Located at a downstream positon to receive the rope of bulk molding compound are a pair of shaping rollers 284 and 286 as shown. The roller 286, which is the lower of the rollers, has a peripherally extending rim 288 which extends within a groove 290 formed in the upper of the rollers 284. However, it can be observed that the rim 288 has a thickness somewhat less than the overall width of the groove 290. As a result, when the bulk molding material passes between the two rollers 284 and 286, the rim 188 and the groove 290 impart somewhat of a U-shaped cross-section to the bulk molding compound, as more fully illustrated in FIG. 24.

The rollers 284 and 286 are each, respectively journaled on a pair of enlarged upstanding side walls forming part of the housing 280 by means of a pair of horizontally extending roller shafts 292 and 294, respectively. These roller shafts are on a pair of enlarged upstanding side walls 296 forming part of the bracket 280.

The formed rope of bulk molding material is then carried by the continuous cord 298 which is provided from a source (not shown) on the frame 266. This source may adopt the form of a spool of the continuous cord which is unwound from the spool continuously during the operation of the apparatus, and feeding of the reinforcing material into the die cavities. By further reference to FIG. 21, it can be observed that the somewhat U-shaped rope of bulk molding material can be disposed over the cord such that the cord 298 fits upwardly within the trough of the rope of bulk molding material.

A cutting device 300 is also provided with the apparatus and includes a pair of notched cutting blades 302. These cutting blades 302 are mounted for pivotal movement on vertically disposed shafts 303. The blades 302 are located to receive the rope of bulk molding material and are designed to cut the bulk molding material into discrete sections, without cutting the continuous cord 298. The notched cutting blades pivot toward each other to cut the bulk molding compound and the notches allow the cord 298 to remain unsevered. In this way, the cord will remain continuous in the stream of filamentary material entering the die channel, but the bulk molding compound will be in discrete sections. Further, these various discrete sections will actually constitute the plugs 252 which enter into the die channel after they have been molded to a desired shape, as hereinafter described in more detail.

A feeding mechanism 304, which is more fully illustrated in FIG. 21, is provided for feeding the various plugs of bulk molding material at a desired rate. The feeding mechanism comprises a crank arm 306 on the shaft 294 and which is designed to cause incremental rotation of the lower roller 286. Moreover, the shaft 294 is caused to move from a rest position, as illustrated by the axis line 308, to the position as illustrated in FIG. 21. A ratchet mechanism (not shown) is mounted within a hub 295 which journals the shaft 294. This permits the shaft 294 to rotate in one direction only, thus permitting the rollers 284 and 286 to rotate in the feed direction, but not in the opposite direction.

A pneumatically operated, or otherwise a hydraulically operated cylinder 310, is connected to the crank arm 306 to cause movement of the same from the axis line 308 to the position as illustrated in FIG. 21 and back to the axis line 308. The cylinder 310 is connected to a suitable control system in order to control the timing of the movement of the crank arm 306. In this way, it is possible to control the rate of movement of the various individual sections. Consequently, the spacing of the individual sections, and hence the plugs, is controlled by a relatively simple mechanism.

The individual discrete sections of plug-forming material are shaped, and more specifically molded, into a desired shape by means of a cold die mechanism, often referred to as a "briquetting" die mechanism as shown in FIGS. 22b and FIGS. 26–27. The die mechanism 314 is often referred to as a "briquetting" die mechanism inasmuch as the various sections of plug-forming material are molded into a shape which sometimes appear similar to that of a briquett. Further, this die mechanism is essentially a cold molding die mechanism in that little or no heat is required to mold the various plugs of material into the desired shape. The plug-forming material is somewhat putty-like in substance so that it can be molded into the desired shape with only some pressure and which substance will thereafter essentially retain that shape.

The cold die mechanism 314 generally comprises a main frame 316 having a pair of laterally spaced apart longitudinally extending carriage supporting rods 318 for supporting a longitudinally reciprocatable carriage 320. The carriage 320 is generally comprised of a main frame 322 having a bottom plate structure 324. Secured to the bottom plate structure 324 is an L-shaped bracket 326 which provides for securement to a puller rod 328. This puller rod 328 is secured to the bracket 326 by means of a pair of nuts 330 and an extension 332 is secured thereto for connection to another portion of the puller rod not shown. The puller rod 328 extends generally longitudinally through the plug-forming device and is supported by means of pairs of spaced apart upper and lower rollers 334. These rollers 334 may be suitably journaled in any desired supporting structure.

The puller rod 328 is pulled back and forth in a reciprocative manner coordinated to the timing of the movement of the continuous cord 298 and the various bulk molding segments 252 disposed thereon. Thus, the carriage is designed to move at the same rate of speed as the continuous cord 298 as well as the various bulk molding plugs 252. Any suitable means for controlling the timing, and which may be conventional in the prior art, may be used for this purpose. However, simple hydraulic control timing is used throughout most of the apparatus of the present invention.

Mounted on the base structure 322 are a pair of spaced apart upstanding plates 336 and each of which carry a rod engaging sleeve 338 or so-called "slide". The aforesaid slides 338 are slideable on and supported by the rods 318. Also mounted on the base structure 322 are a pair of laterally spaced apart upstanding posts 340. Mounted on the upper end of each of the upstanding posts 340 is a gusseted bracket 342 having a lower bracket plate 344. Secured to the bracket plate 344 is an upper flat carriage plate 346 and which cooperates with a lower flat plate; 347 which is slotted to accomodate the posts 340. Secured to the undersurface of the upper carriage plate 346 is a guide plate 348 which engages a pair of laterally spaced apart dies 350 and guides them during opening and closing movement thereof.

The lower carriage structure 322 is provided with an anviletype plate 352 which functions as a carriage plate and is carried by an upstanding post 353. Mounted on the upper surface of the plate 352 is a guide plate 354 which carries the dies 350 and also guides them during opening and closing movement. A pair of hydraulic cylinder mechanisms 356 are provided for horizontally opening and closing the dies 350. Each cylinder mechanism 356 is comprised of a hydraulic cylinder 358 and an extendable and retractable piston 360.

The upper carriage plate 346 and the lower plate 347 are connected together by means of four bolts 368 located in somewhat of a trapezoidal arrangement. These bolts 368 extend through apertures formed in each of the plates 346 and 347 and which are secured by pairs of upper and lower nuts 370, in the manner as more fully illustrated in FIGS. 26 and 27 of the drawings. Furthermore, each of these bolts 368 have externally threaded portions at both of the upper and lower ends thereof so that convenient adjustment can be made in a fairly simple matter. This structure is effective in overcoming the effects twisting forces.

The dies 350 may be provided at their inlet ends with guides 376 which serve to guide the incoming material into the channel formed between the dies 350. At their outlet ends, a guide mechanism may also be provided. The inlet guide 376 may be suitably operated by means of the same or separate hydraulic piston-cylinder arrangement.

In actual operation, the carriage travels with the plugs of material and at the same rate of speed. Furthermore, the upper and lower dies are timed to cooperate with the rate of speed of the continuous cord 298 which carries the sections of plug-forming material 252. As each section of plug-forming material reaches the dies, which again, are traveling at the same rate of speed, the dies will separate permitting the plug of material to enter into a die cavity (not shown) but which has the desired size and shape to form the bulk molding compound into a plug of the desired size and shape. Thereafter, the dies will close thereby shaping the section into a plug which will ultimately enter the die channel and will be formed into a composite article as aforesaid.

Inasmuch as the bulk molding compound is fairly viscous, it is not necessary to apply a substantial amount of heat to the dies. The dies are constructed so that they are moved together with sufficient force in order to displace the bulk molding compound into the desired shape and size.

As shown in FIG. 20, the continuous cord 298, carrying the various plugs 252, is introduced into the stream of binder impregnated reinforcing material and will enter the die channel, as aforesaid. The remaining portion of the operation of the apparatus D is similar to that of the apparatus C as described above.

Thus, there has been illustrated and described a unique and novel improved reinforced plastic composite article which may be curved and may have a non-uniform cross-sectional shape over its length, and method and apparatus for producing same, and which fulfills all of the objects and advantages sought therefore. It should be understood that many changes, modifications, variations, and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention which is limited only by the following claims.

Having thus described my invention, what I desire to claim and secure by Letters Patent is:

1. A method for producing and an arcuately shaped filament containing reinforced plastic composite article having a non-constant cross-sectional shape over its length, said method comprising:
   (a) introducing a filament containing reinforcing material into an elongate die channel created by a first arcuately shaped die-forming member and an arcuately shaped second die-forming member, and where said first die-forming member has a recess which is of non-constant cross-sectional shape, said recess and hence said die channel having a first channel portion of different cross-sectional shape than a second contiguous channel portion thereof so to be of non-constant cross-sectional shape over its length,
   (b) moving at least said first die-forming member and simultaneously pulling therewith the reinforcing material through the die channel so that the reinforcing material is simultaneously disposed in both die channel portions at a portion of the time during movement of at least said first die-forming member,
   (c) applying a curing energy to the material in each of said die channel portions to thereby cure a binder impregnated therein and thereby form a composite article having a non-constant cross-sectional shape so that said article has a first section with a first cross-sectional shape and a second contiguous integrally formed section with a second cross-sectional shape different than said first cross-sectional shape, and
   (d) continuing to move said first die-forming member to permit exit and removal of the composite article from the die channel.

2. The method of claim 1 further characterized in that the method comrises pulling the reinforcing material through the die channel.

3. The method of claim 2 further characterized in that said method comprises moving said material through a die channel having a constant volume over its length to produce a reinforced plastic article with a non-constant cross-sectional shape but a constant cross-sectional volume over its length.

4. The method of claim 1 further characterized in that said method comprises introducing a plug of material into selected portions of said reinforcing material to thereby increase the overall cross-sectional volume at selected portions of reinforcing material to produce a reinforced plastic article with a non-constant cross-sectional shape and a non-constant cross-sectional volume over its length.

5. The method of claim 1 further characterized in that said method comprises impregnating the reinforcing material with a resin matrix prior to introduction into said die channel.

6. The method of claim 1 further characterized in that said method comprises pulling the reinforcing material through a die with an arcuate shape and constant radius so that the article has a constant radius such that all portions of the article over its length is defined by a constant radius.

7. The method of claim 1 further characterized in that said method comprises pulling the reinforcing material through a die cavity of arcuate shape but of non-constant radius over its length so that the article has a non-constant radius and is comprised of arcuate sections defined by different radii over its length.

8. A method for producing filament containing reinforced plastic composite articles on a continuous basis which have a non-constant cross-sectional shape, said method comprising:
   (a) introducing a filament containing reinforcing material into an elongate die channel created by a first die-forming member and a second arcuately shaped die-forming member and which first die-forming member has a first arcuately shaped elongate recess portion and a second arcuately shaped elongate recess portion which are contiguous with and communicating with each other and also having arcuate cross-sectional shapes and which recess portions are each defined by a different radius,
   (b) moving at least said first die-forming member and simultaneously pulling therewith a filament containing reinforcing material through said die channel and into said first and second recess portions and which reinforcing material simultaneously remains in both said recess portions during a portion of movement of at least said first die-forming member, and
   (c) applying a curing energy to the filament containing reinforcing material in each of said recess portions to thereby cure a binder impregnated therein while in said recess portions and thereby form an arcuately shaped composite article having at least two arcuately shaped portions with each being defined by a different radius.

9. The method of claim 8 further characterized in that the method comprises pulling the reinforcing material through at least one of said recess portions which has a non-constant cross-sectional shape over its length so that the composite article has a non-constant cross-section over its length.

10. The method of claim 8 further characterized in that said die channel has a constant volume over its entire length, although with non-constant shape, and pulling the material through said die channel to thereby produce a reinforced plastic composite article with non-constant cross-sectional shape but with constant cross-sectional volume over its length.

11. The method of claim 8 further characterized in that said die channel has a non-constant volume over portions of its length compared to any other portions although with non-constant shape, and pulling the material through said die channel to thereby produce a reinforced plastic composite article with non-constant cross-sectional shape and with non-constant cross-sectional volume over its length.

12. A method for producing filament containing reinforced plastic composite articles which have a non-constant cross-sectional volume over their length, said method comprising:
   (a) introducing a binder impregnated filament containing reinforcing material into a die channel created by an arcuately shaped first die-forming member having an elongate recess which is of non-constant cross-sectional volume, and arcuately shaped second die-forming member cooperating with said first die-forming member to close said recess and form said filament containing reinforcing material receiving die channel,
   (b) moving at least one of the die forming members and simultaneously pulling the binder impregnated reinforcing material through said die channel and which partially forms said article when the binder in the material is hardened,
   (c) introducing a plug into said reinforcing material at selected locations to increase the volume at each such selected location, and which plugs are formed of a moldable material capable of hardening during a curing of the binder, (d) also pulling the plugs with the reinforcing material during movement of moving at least one of said die-forming members so that the filament containing reinforcing material and said plugs remain in said die channel during a substantial portion of the movement of the die forming member, and (e) applying a curing energy to both the binder in the reinforcing material and harden the plugs to thereby form a reinforced plastic composite article having a non-constant volume over its length.

13. The method of claim 12 further characterized in that the method comprises entraping the plugs between strands of the reinforcing material and pulling the plugs and reinforcing material through the die channel in that manner.

14. The method of claim 12 further characterized in that said method comprises introducing a plug of material into selected portions of said reinforcing material to thereby increase the overall cross-sectional volume at selected portions of reinforcing material to produce a reinforced plastic article with a non-constant cross-sectional shape and a non-constant cross-sectional volume over its length.

15. The method of claim 12 further characterized in that said method comprises impregnating the reinforcing material with a resin matrix prior to introduction into said die channel.

16. The method of claim 12 further characterized in that said method comprises pulling the reinforcing material through a die with an arcuate shape and constant radius so that the article has a constant radius such that all portions of the article over its length is defined by a constant radius.

17. The method of claim 12 further characterized in that said method comprises pulling the reinforcing material through a die cavity of arcuate shape but of non-constant radius over its length so that the article has a non-constant radius and may be comprised of arcuate sections defined by different radii over its length.

18. A method for producing an arcuately shaped filament containing reinforced plastic composite article having a non-constant cross-sectional shape over its length, said method comprising:

(a) introducing a filament containing reinforcing material into a die channel created by a first arcuately shaped die-forming member and a continuous belt located in proximity to and having successive portions which engage said first die-forming member to form a reinforcing material die channel comprised of at least an elongate recess which is of non-constant cross-sectional shape, said die channel having a first channel portion of different cross-sectional shape than a second contiguous channel portion thereof so to be of non-constant cross-sectional shape over its length, (b) moving at least said first die-forming member and said belt in generally the same direction and at the same rate of speed and simultaneously pulling therewith the reinforcing material through the die channel, and (c) applying a curing radiation to the material in said die channel to thereby cure a binder impregnated therein and thereby form a composite article having a non-constant cross-sectional shape so that said article has a first section with a first cross-sectional shape and a second contiguous integrally formed section with a second cross-sectional shape different than said first cross-sectional shape.

19. The method of claim 18 further characterized in that said method comprises continuing to move said first die-forming member to permit exit and removal of the composite article from the die channel.

20. The method of claim 18 further characterized in that said method comprises moving said material through a die channel having a constant volume over its length to produce a reinforced plastic article with a non-constant cross-sectional shape but a constant cross-sectional volume over its length.

21. The method of claim 18 further characterized in that said method comprises introducing a plug of material into selected portions of said reinforcing material to thereby increase the overall cross-sectional volume at selected portions of reinforcing material to produce a reinforced plastic article with a non-constant cross-sectional shape and a non-constant cross-sectional volume over its length.

22. The method of claim 18 further characterized in that said method comprises impregnating the reinforcing material with a resin matrix prior to introduction into said die channel.

23. The method of claim 18 further characterized in that said method comprises pulling the reinforcing material through a die with an arcuate shape and constant radius so that the article has a constant radius such that all portions of the article over its length is defined by a constant radius.

24. The method of claim 18 further characterized in that said method comprises pulling the reinforcing material through a die cavity of arcuate shape but of non-constant radius over its length so that the article has a non-constant radius and may be comprised of arcuate sections defined by different radii over its length.

* * * * *